US009921515B2

(12) United States Patent
Yano et al.

(10) Patent No.: US 9,921,515 B2
(45) Date of Patent: Mar. 20, 2018

(54) OPTICAL WRITING DEVICE, IMAGE FORMING APPARATUS, AND TEMPERATURE CALCULATION METHOD

(71) Applicant: KONICA MINOLTA, INC., Chiyoda-ku (JP)

(72) Inventors: So Yano, Ibaraki (JP); Satoshi Masuda, Neyagawa (JP); Makoto Obayashi, Toyokawa (JP); Masayuki Iijima, Okazaki (JP); Yoshikazu Watanabe, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 674 days.

(21) Appl. No.: 14/511,205

(22) Filed: Oct. 10, 2014

(65) Prior Publication Data
US 2015/0103865 A1    Apr. 16, 2015

(30) Foreign Application Priority Data
Oct. 11, 2013 (JP) .................... 2013-213715

(51) Int. Cl.
| G01J 5/00 | (2006.01) |
| G01K 7/00 | (2006.01) |
| G03G 15/043 | (2006.01) |
| G06K 15/02 | (2006.01) |
| G06K 15/12 | (2006.01) |
| G01K 7/01 | (2006.01) |
| G01K 7/42 | (2006.01) |

(52) U.S. Cl.
CPC ............ *G03G 15/043* (2013.01); *G01K 7/01* (2013.01); *G01K 7/42* (2013.01); *G06K 15/027* (2013.01); *G06K 15/1247* (2013.01)

(58) Field of Classification Search
USPC ...................... 374/120, 141, 184
See application file for complete search history.

(56) References Cited

U.S. PATENT DOCUMENTS
2009/0026571 A1    1/2009 Inagaki et al.

FOREIGN PATENT DOCUMENTS
| CN | 102969421 | 3/2013 |
| JP | 2004-259724 A | 9/2004 |
| JP | 2006-201751 A | 8/2006 |
| JP | 2007-019577 A | 1/2007 |
| JP | 2007-318503 A | 12/2007 |
| JP | 2009-032950 A | 2/2009 |

(Continued)

OTHER PUBLICATIONS

Official Action issued in corresponding Chinese Patent Application No. 201410528315.3, dated Nov. 23, 2015, with English language translation (21 pages).

(Continued)

*Primary Examiner* — Mirellys Jagan
(74) *Attorney, Agent, or Firm* — Buchanan Ingersoll & Rooney PC

(57) ABSTRACT

An optical writing device having; a plurality of light-emitting points; a photodiode configured to output a signal which represents a quantity of incident light from a predetermined light-emitting point selected from the plurality of light-emitting points; and a calculation section for calculating a temperature of the photodiode based on a magnitude of a photodiode dark current included in the signal output from the photodiode while the predetermined light-emitting point is OFF.

20 Claims, 15 Drawing Sheets

(56) References Cited

FOREIGN PATENT DOCUMENTS

JP         2009-222478 A     10/2009
JP         2011-023388 A     2/2011

OTHER PUBLICATIONS

Office Action (Notification of Reasons for Rejection) dated Oct. 6, 2015, by the Japanese Patent Office in corresponding Japanese Patent Application No. 2013-213715, and an English Translation of the Office Action. (8 pages).

FIG. 1
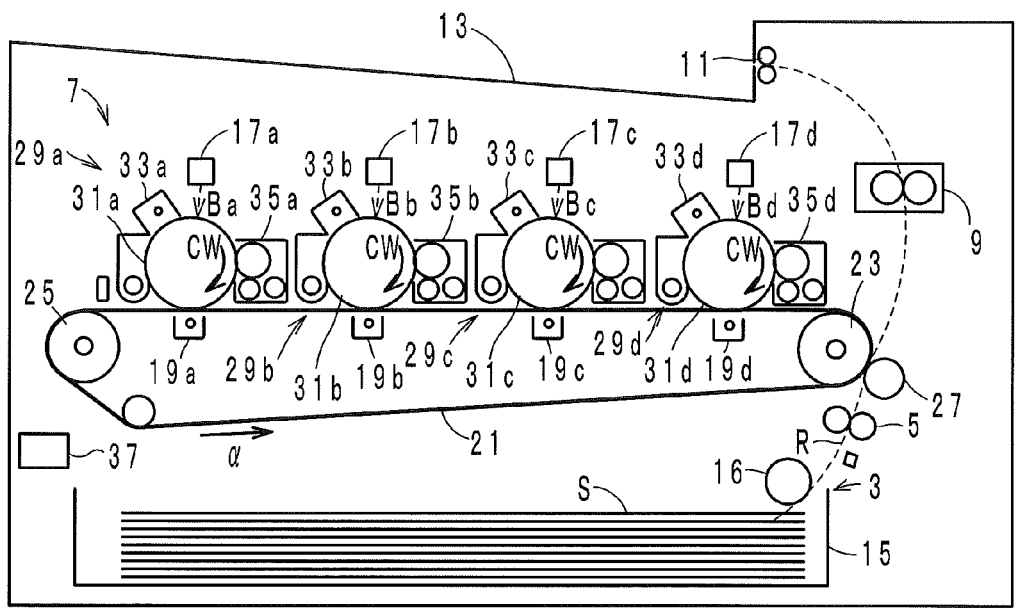
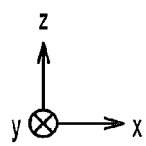

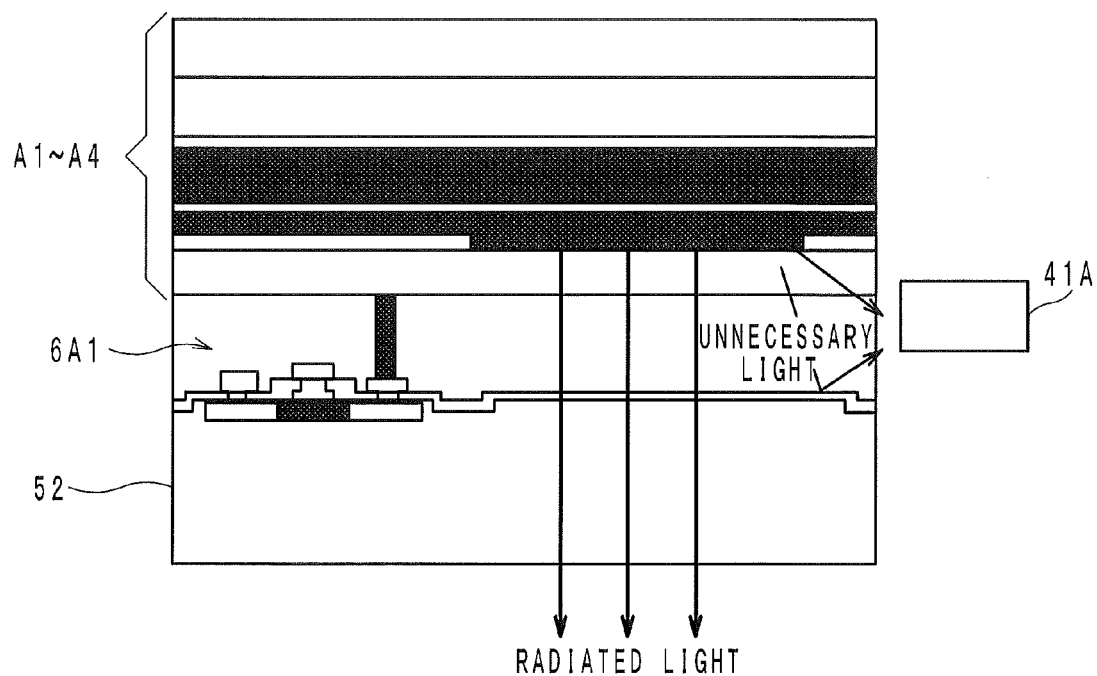

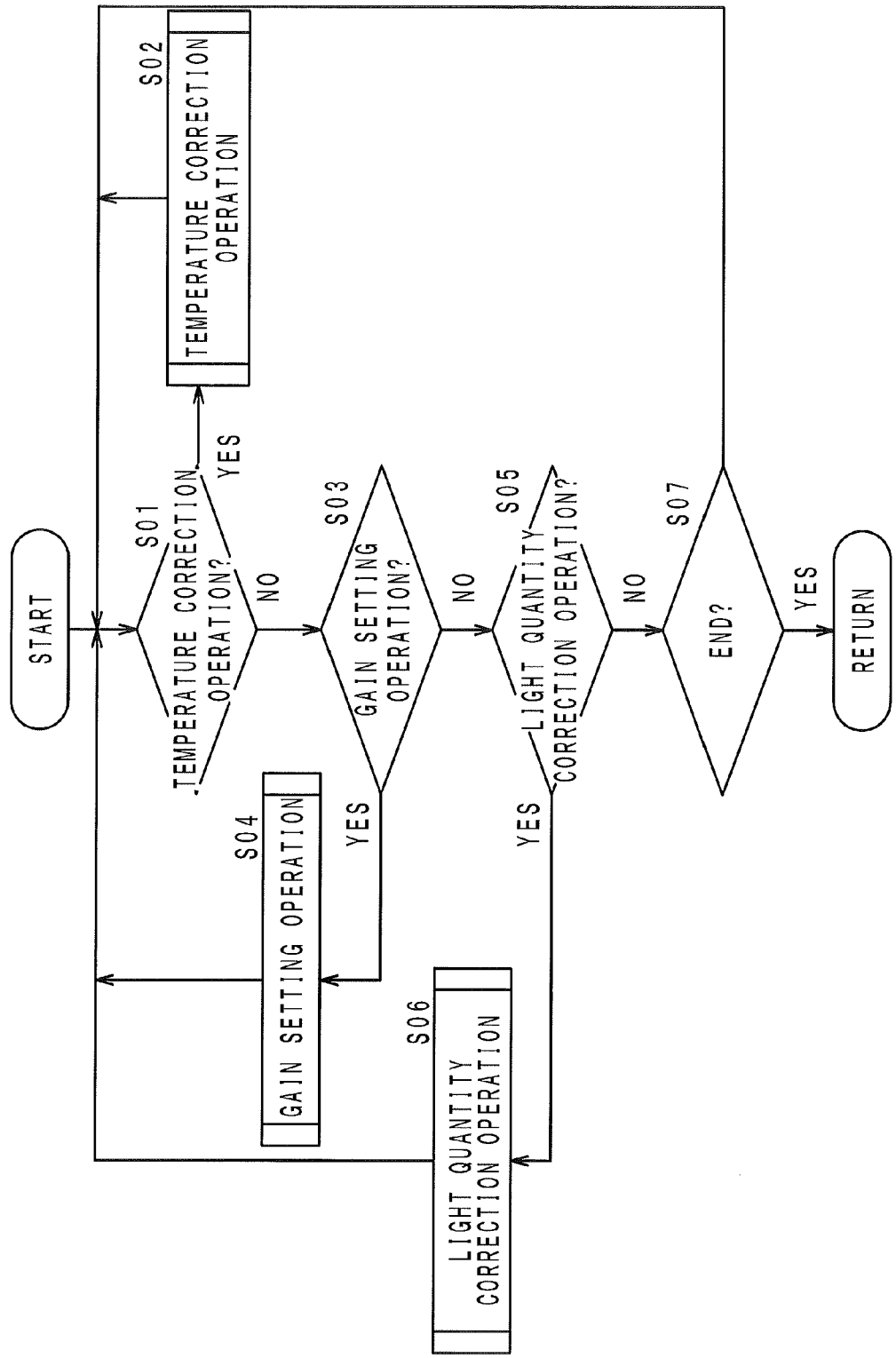

_US 9,921,515 B2_

OPTICAL WRITING DEVICE, IMAGE FORMING APPARATUS, AND TEMPERATURE CALCULATION METHOD

This application is based on Japanese Patent Application No. 2013-213715 filed on Oct. 11, 2013, the content of which is incorporated herein by reference.

BACKGROUND OF THE INVENTION

1. Field of the Invention

The present invention relates to an optical writing device including a photodetector for detecting the quantity of light emitted from a light-emitting point, an image forming apparatus, and a temperature calculation method.

2. Description of Related Art

In an image forming apparatus, an optical writing device is used for formation of images. One of known examples of the invention relating to conventional optical writing devices is a light-emitting device disclosed in Japanese Patent Laid-Open Publication No. 2006-201751. The light-emitting device includes a light-emitting element for light quantity detection, which is not provided for an intended use and which is exclusively used for detection of light, a light quantity detector for detecting the quantity of light from the light-emitting element for light quantity detection, and a corrector for correcting the driving conditions of a light-emitting element based on the quantity of light from the light-emitting element for light quantity detection such that the variation of the quantity of light from the light-emitting element is suppressed.

In the light-emitting device disclosed in Japanese Patent Laid-Open Publication No. 2006-201751, as the temperature increases, the quantity of light from the light-emitting element for light quantity detection also increases. As the temperature decreases, the quantity of light from the light-emitting element for light quantity detection also decreases. That is, the light-emitting element for light quantity detection has a temperature dependence. In view of such, the corrector determines an increase or decrease of the temperature of the light-emitting element for light quantity detection based on the quantity of light from the light-emitting element for light quantity detection which is detected by the light quantity detector, and corrects the driving voltage of the light-emitting element for light quantity detection. With this configuration, in the light-emitting device disclosed in Japanese Patent Laid-Open Publication No. 2006-201751, the variation of the light quantity which is attributed to the variation of the temperature of the light-emitting element can be corrected.

A light quantity detector such as a photodetector has such a characteristic that, even when the intensity of incident light is equal, the level of the output varies depending on the temperature of the light quantity detector. That is, the light quantity detector has a temperature dependence. On the other hand, in the light-emitting device disclosed in Japanese Patent Laid-Open Publication No. 2006-201751, the temperature dependence of the light-emitting element is considered, but the temperature dependence of the light quantity detector that corresponds to the light-emitting element is not considered. Therefore, in the light-emitting device disclosed in Japanese Patent Laid-Open Publication No. 2006-201751, it is difficult for the light quantity detector to accurately detect the quantity of light from the light-emitting element for light quantity detection. Without accurate detection of the quantity of light from the light-emitting element for light quantity detection, the quantity of light used for writing varies, and an image formed in the image forming apparatus deteriorates.

SUMMARY OF THE INVENTION

An object of the present invention is to provide an optical writing device in which the temperature of a photodetector can be determined, an image forming apparatus, and a temperature calculation method.

An optical writing device according to one embodiment of the present invention includes: a plurality of light-emitting points; a photodiode configured to output a signal which represents a quantity of incident light from a predetermined light-emitting point selected from the plurality of light-emitting points; and a calculation section for calculating a temperature of the photodiode based on a magnitude of a photodiode dark current included in the signal output from the photodiode while the predetermined light-emitting point is OFF.

An image forming apparatus according to another embodiment of the present invention includes the above-described optical writing device.

A temperature calculation method according to still another embodiment of the present invention is a temperature calculation method for determining, in an optical writing device including a plurality of light-emitting points, a temperature of a photodiode configured to output a signal which represents a quantity of incident light from a predetermined light-emitting point selected from the plurality of light-emitting points, the method including the steps of; acquiring a signal from the photodiode while the predetermined light-emitting point is OFF; and determining the temperature of the photodiode based on a magnitude of a photodiode dark current included in the signal.

BRIEF DESCRIPTION OF THE DRAWINGS

FIG. 1 is a schematic diagram showing an image forming apparatus which includes an optical writing device of one embodiment.

FIG. 5C is a vertical cross-sectional view showing details of the configuration of the photodetector shown in FIG. 3 and FIG. 4A.

FIG. 6 is a flowchart of an operation carried out by a control circuit of the OLED-PH.

DETAILED DESCRIPTION OF THE PREFERRED EMBODIMENTS

Introduction

Figure 2A:
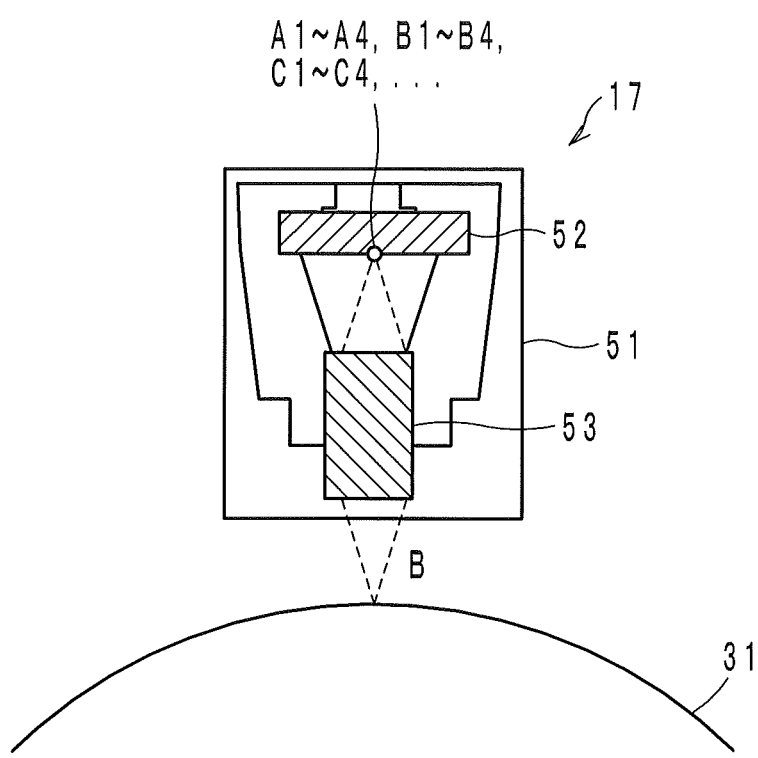
FIG. 2A is a vertical cross-sectional view of an OLED-PH shown in FIG. 1.

Hereinafter, an image forming apparatus capable of adopting any one of the optical writing devices according to embodiments of the present invention, and a temperature detection method, are described in detail with reference to the drawings.

First, the x-axis, the y-axis and the z-axis in the drawings are described. In the following description of the embodiments, for convenience sake, the x-axis, the y-axis and the z-axis are the right-left direction (horizontal direction), the front-back direction (depth direction) and the up-down direction (vertical direction). In the drawings, some elements are denoted by reference numbers with suffixes a, b, c and d attached thereto. The suffixes a, b, c and d mean yellow (Y), magenta (M), cyan (C) and black (Bk), respectively. For example, an image forming unit 29a means an image forming unit 29 for yellow. A reference number with no suffix means an element for each of the colors Y, M, C and Bk. For example, an image forming unit 29 means each of the image forming units respectively for the colors Y, M, C and Bk.

Structure and Operation of the Image Forming Apparatus

Figure 2B:
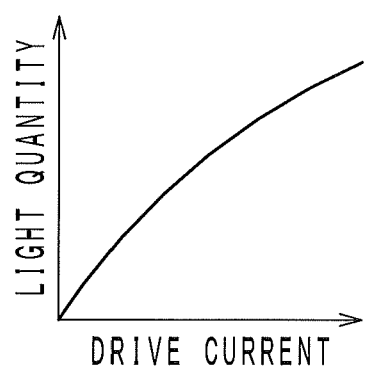
FIG. 2B is a graph showing the quantity of light emitted from a light-emitting point shown in FIG. 2A with respect to the drive current.

FIG. 1 is a schematic diagram showing an image forming apparatus 1 which includes an optical writing device of one embodiment. FIG. 2A is a vertical cross-sectional view of an OLED-PH 17 shown in FIG. 1. FIG. 2B is a graph showing the quantity of light emitted from a light-emitting point shown in FIG. 2A with respect to the drive current. In FIG. 1, the image forming apparatus 1, which is, for example, an MFP (multifunction peripheral), forms toner images in the respective colors by using photoreceptor drums 31 for the respective colors, combines the toner images to form a composite toner image and prints the composite toner image on a sheet S. For this purpose, the image forming apparatus 1 generally comprises a sheet feed unit 3, a pair of timing rollers 5, a process unit 7, a fixing device 9, a pair of ejection rollers 11 and a printed-sheet tray 13.

The sheet feed unit 3 comprises a feed tray 15 and feed roller 16. On the feed tray 15, a plurality of sheets S to be printed are stacked. The feed roller 16 picks up the topmost one from the stack of sheets S and feeds the sheet S into a sheet path R. The sheet S is fed toward the pair of timing rollers 5 located immediately downstream.

The pair of timing rollers 5 comprises a pair of rollers in contact with each other on the sheet path R. The pair of timing rollers 5 are rotated and stopped under control of a control circuit 37. The pair of timing rollers 5 stays in a stopped state except for the time of feeding the sheet S. Accordingly, the sheet S fed to the pair of timing rollers 5 runs head-on into a contact portion of the timing rollers 5, whereby the sheet S stops. Thereafter, the pair of timing rollers 5 starts rotating at predetermined timing to feed the sheet S toward a secondary transfer area, which will be described later.

The process unit 7 comprises OLED-PHs 17 for the respective colors, transfer devices 19 for the respective colors, an intermediate transfer belt 21, a drive roller 23, a driven roller 25, a secondary transfer roller 27, and image forming units 29 for the respective colors. Each of the image forming units 29 generally comprises a photoreceptor drum 31, and a set of a charger 33 and a developing device 35 arranged along the peripheral surface of the photoreceptor drum 31.

Each of the photoreceptor drums 31 for the respective colors extends in the y-axis direction. These photoreceptor drums 31 are arranged in the x-axis direction. Each of the photoreceptor drums 31 is driven by a motor (not shown) to rotate clockwise (shown by arrow CW) in a zx-plane about an axis in parallel to the y-axis direction.

Each of the chargers 33 extends in the y-axis direction and charges the peripheral surface of the corresponding photoreceptor drum 31. The chargers 33 are typically corotron chargers, scorotron chargers or charging rollers.

Each of the OLED-PHs 17 is an optical writing device located near the peripheral surface of the corresponding photoreceptor drum 31 and immediately downstream of the corresponding charger 33 in the rotating direction CW of the photoreceptor drum 31. Each of the OLED-PHs 17, as shown by FIG. 2A, comprises at least an OLED substrate 52 and a lens array 53 held in a holder 51.

The holder 51 extends in parallel to the corresponding photoreceptor drum 31 and is opposed to an exposure position where the corresponding photoreceptor drum 31 is exposed to a light beam B.

The OLED substrate 52, as shown in FIG. 2A, supports light-emitting points A1 to A4, B1 to B4, C1 to C4 . . . , of which number is equal to the number of dots in one line in the y-axis direction. (For example, ten thousands and several thousands of light-emitting points are provided).

Each of the light-emitting points A1 to A4, B1 to B4, C1 to C4 . . . is typically an OLED, and the light-emitting points A1 to A4, B1 to B4, C1 to C4 . . . are arranged in a line along the y-axis so as to be opposed to the peripheral surface of the corresponding photoreceptor drum 31. The quantity of light emitted from each of the light-emitting points A1 to A4, B1 to B4, C1 to C4 . . . is relative to the drive current input thereto. With respect to each of the light-emitting points A1 to A4, B1 to B4, C1 to C4 . . . , the correlation between the quantity of emitted light and the input drive current is, as shown by FIG. 2B, almost linear.

The light-emitting points A1 to A4, B1 to B4, C1 to C4 . . . are supported by one OLED substrate 52. Therefore, the light-emitting points A1 to A4, B1 to B4, C1 to C4 . . . can be produced in one process, and among the light-emitting points A1 to A4, B1 to B4, C1 to C4 . . . , there are substantially no variations in input-output characteristics.

Although each of the light-emitting point A1 to A4, B1 to B4, C1 to C4 . . . is a point light source, the light-emitting points A1 to A4, B1 to B4, C1 to C4 . . . as a whole are capable of scanning the peripheral surface of the corresponding photoreceptor drum 31 with the light beam B.

The lens array 53 is held by the holder 51 to be opposed to the light-emitting points A1 to A4, B1 to B4, C1 to C4 . . . in the direction of optical axes. The lens array 53 is, for example, a micro lens array (MLA), a light collection transmitter array or the like. Each of the micro lenses or the collection transmitters may be a rod lens with plane end surfaces. Such components are easily processed, and therefore, mass production of the OLED-PHs 17 is easy. The lens array 53 focuses light B emitted from the light-emitting points A1 to A4, B1 to B4, C1 to C4 . . . on the peripheral surface of the corresponding photoreceptor 31.

In the structure above, the peripheral surface of each of the photoreceptor drums 31 can be scanned with a light beam B for the corresponding color in a main-scanning direction (i.e., the y-axis direction). Thereby, on the peripheral surface of each of the photoreceptor drums 31, an electrostatic latent image for the corresponding color is formed.

Although not shown in FIG. 2A for the sake of convenience, the OLED-PHs 17 have cables, or the like, in addition to the shown components, for connection to the other components of the image forming apparatus 1.

Again refer to FIG. 1. Each of the developing devices 35 has a developing roller extending in the y-axis direction. The developing roller is opposed to the peripheral surface of the corresponding photoreceptor drum 31, immediately downstream of the exposure position where the photoreceptor drum 31 is exposed to the beam B. In each of the developing devices 35, for example, two-component developer of the corresponding color is contained. Each of the developing devices 35 supplies toner to the peripheral surface of the corresponding photoreceptor drum 31 with the built-in developing roller. Thereby, the electrostatic latent image on each of the photoreceptor drums 31 is developed, and a toner image in the corresponding color (unicolor image) is formed.

Through the process above, each of the photoreceptor drums 31 supports a toner image on its peripheral surface. Also, while rotating in the direction CW, each of the photoreceptor drums 31 carries the toner image downstream in the rotating direction CW.

Each of the transfer devices 19 extends in the y-axis direction and is located immediately downstream of the developing device 35 for the corresponding color. Each of the transfer devices 19 is opposed to the peripheral surface of the corresponding photoreceptor drum 31 via the intermediate transfer belt 21, which will be described below.

The intermediate transfer belt 21 is an endless belt. The intermediate transfer belt 21 is stretched between the driving roller 23 and the driven roller 25 so as to lie between the transfer devices 19 and the photoreceptor drums 31. The intermediate transfer belt 21 is pressed onto the photoreceptor drums 31 by the transfer devices 19. The areas where the intermediate transfer belt 21 is in contact with the photoreceptor drums 31 are referred to as primary transfer areas. The driving roller 23 is rotated by a drive force supplied from a motor (not shown). The driven roller 25 rotates following the rotation of the driving roller 23. Thereby, the intermediate transfer belt 21 rotates in the direction shown by arrow α.

A primary transfer bias voltage is applied to each of the transfer devices 19, and thereby, the areas where the transfer devices 19 are in contact with the intermediate transfer belt 21 are charged with an opposite polarity to the toner images. Accordingly, when the toner images carried by the photoreceptor drums 31 reach the primary transfer areas, the toner images move to the outer surface of the intermediate transfer belt 21. Thus, the toner images formed on the photoreceptor drums 31 are transferred to the intermediate transfer belt 21. In the following, the transfer of the toner images to the intermediate transfer belt 21 is referred to as primary transfer.

At this stage, the toner images supported on the respective photoreceptor drums 31 are transferred sequentially on the same area of the intermediate transfer belt 21. By this primary transfer, toner images in the respective colors are combined, thereby resulting in formation of a composite toner image. The intermediate transfer belt 21 supports the composite toner image on its outer surface, and carries the composite toner image to the secondary transfer roller 27 while rotating.

The secondary transfer roller 27 is opposed to the driving roller 23 via the intermediate transfer roller 21 and is pressed by the intermediate transfer belt 21. The area where the intermediate transfer belt 21 is in contact with the secondary transfer roller 27 is hereinafter referred to as a secondary transfer area. As mentioned, the sheet S is fed to and passes through the secondary transfer area, and the composite toner image supported on the intermediate transfer belt 21 is carried to the secondary transfer area. A secondary transfer bias voltage is applied to the secondary transfer roller 27, and thereby, the secondary transfer roller 27, which is located at the back side (non-image-receiving side) of the sheet S, is charged with an opposite polarity to the composite toner image. Accordingly, the composite toner image moves from the outer surface of the intermediate transfer belt 21 to the front side (image-receiving side) of the sheet S. Thus, the composite toner image carried by the intermediate transfer belt 21 is transferred to the sheet S. This image transfer to the sheet S is hereinafter referred to as secondary transfer.

The sheet S that has received the composite toner image is fed to the fixing device 9. The fixing device 9 fixes the composite toner image on the sheet S by heating and pressing the sheet S. The sheet S that has been subjected to the fixing process is ejected through the pair of ejection rollers 11 and is placed on the printed-sheet tray 13.

The respective sections described above are controlled by the control circuit 37 built in the body of the image forming apparatus 1. The control circuit 37 comprises a CPU, a main memory, etc. and runs in accordance with a prepared program to control the printing operation of the image forming apparatus 1, and a gain setting operation, a temperature correction operation, and a light quantity correction operation, which will be described later.

Configuration of OLED-PH

Figure 3:
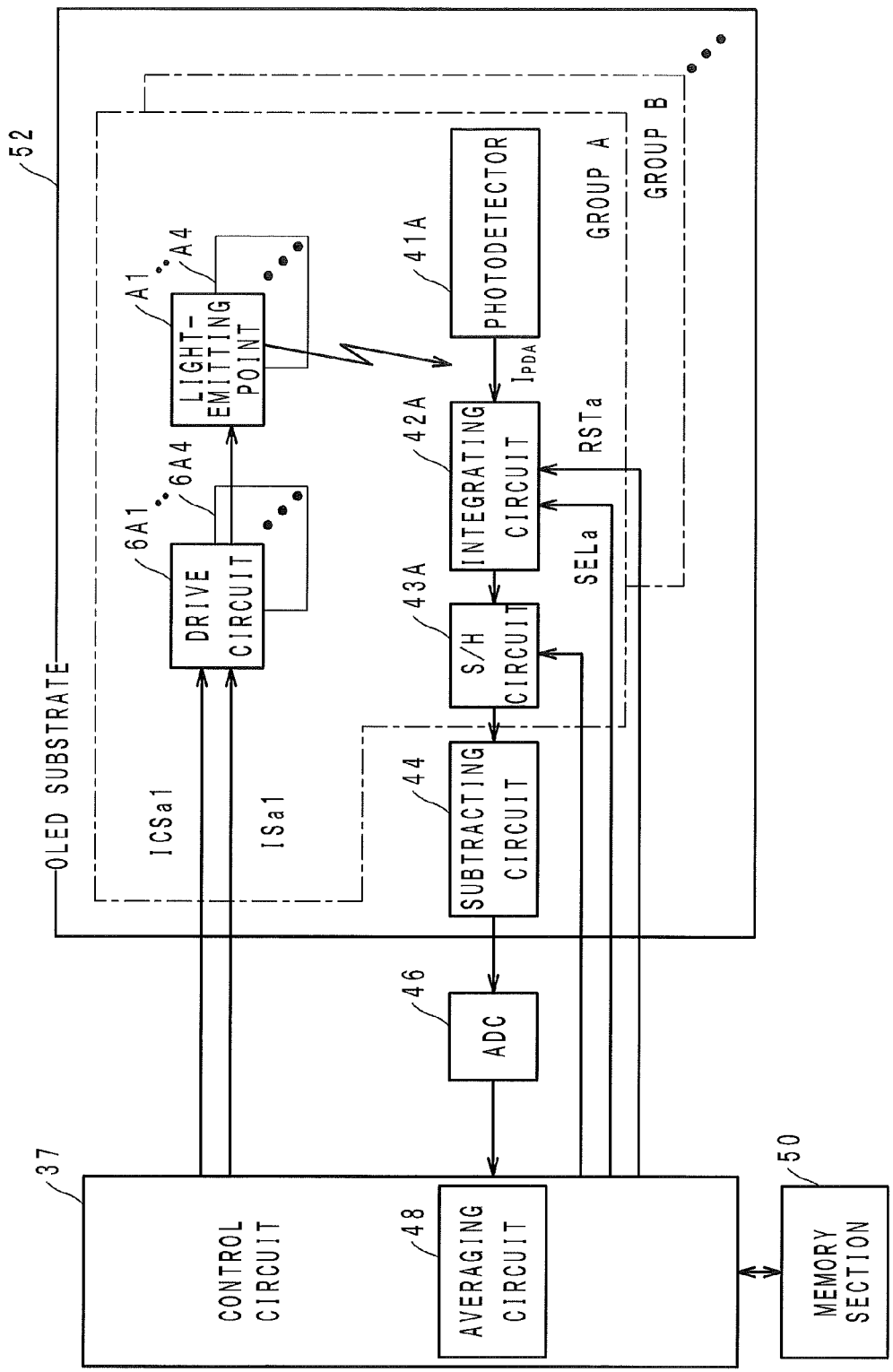
FIG. 3 is a first block diagram showing details of the configuration of the OLED-PH and surrounding components.
Figure 4A:
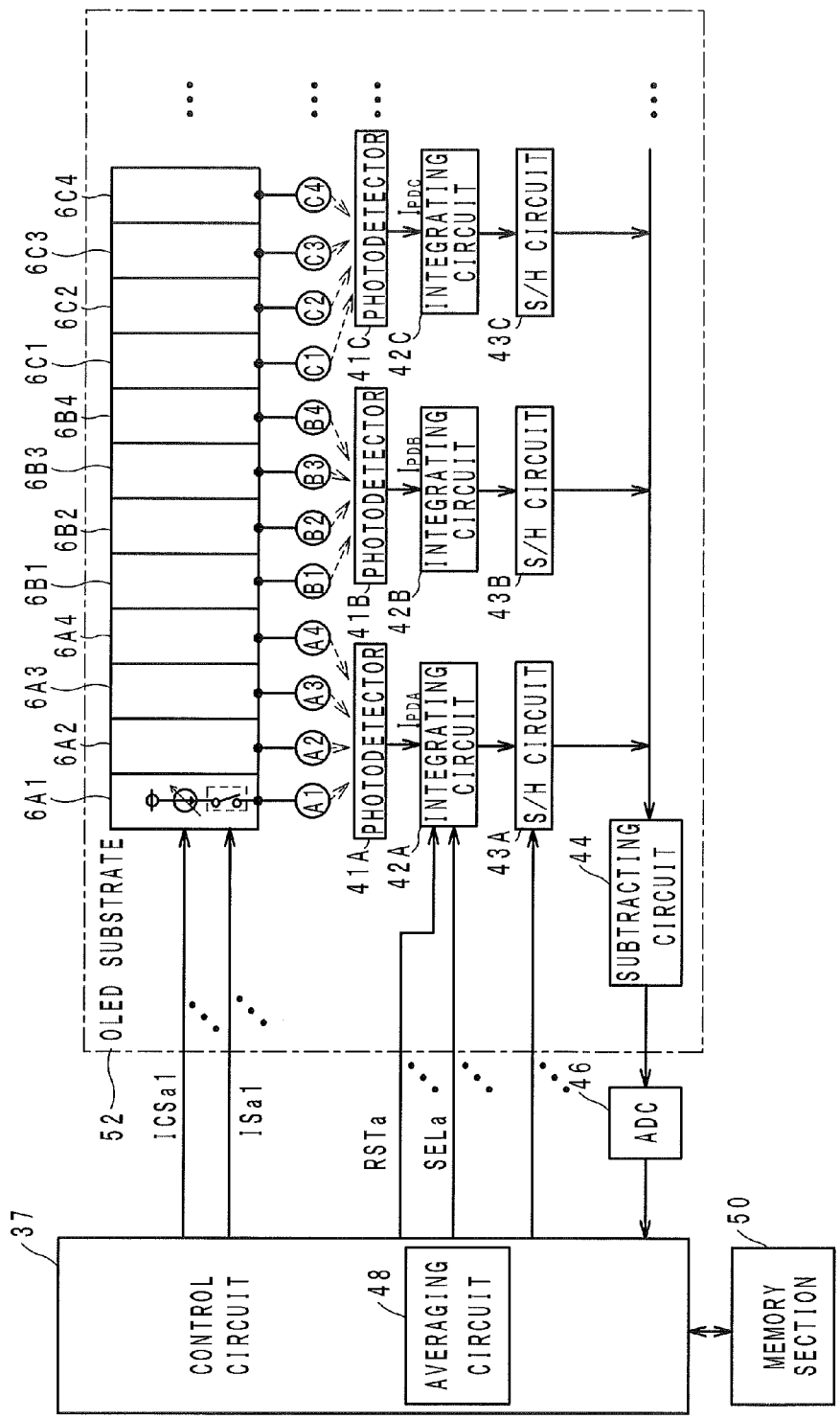
FIG. 4A is a second block diagram showing details of the configuration of the OLED-PH and surrounding components.
Figure 4B:
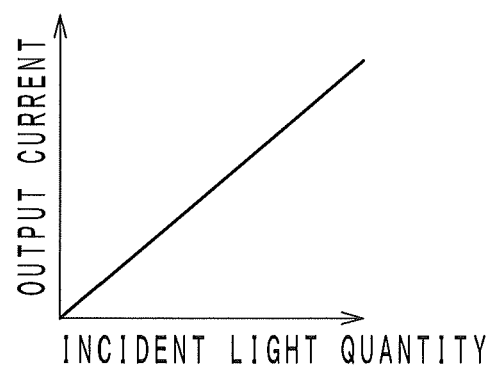
FIG. 4B is a graph showing the output value (output current) of a photodetector shown in FIG. 4A with respect to the quantity of incident light.
Figure 5A:
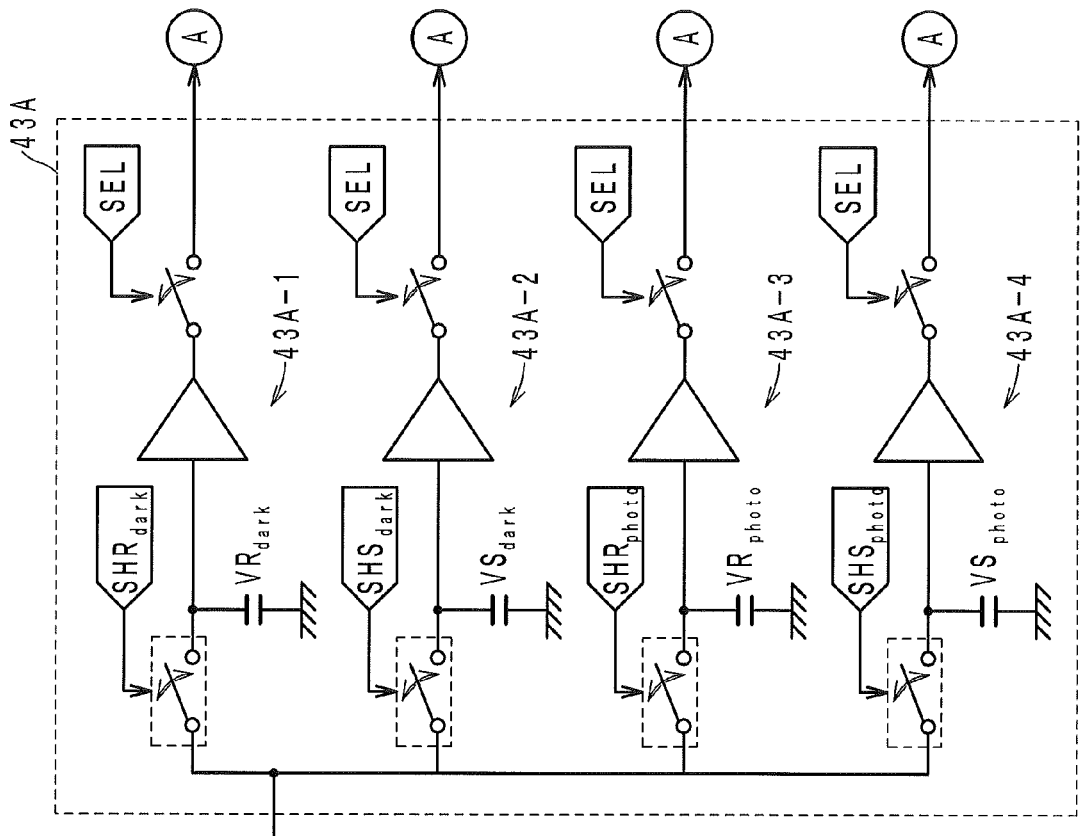
FIG. 5A is a circuit diagram showing details of the configuration of a photodetector, an integrating circuit, and a S/H circuit shown in FIG. 3 and FIG. 4A.
Figure 5B:
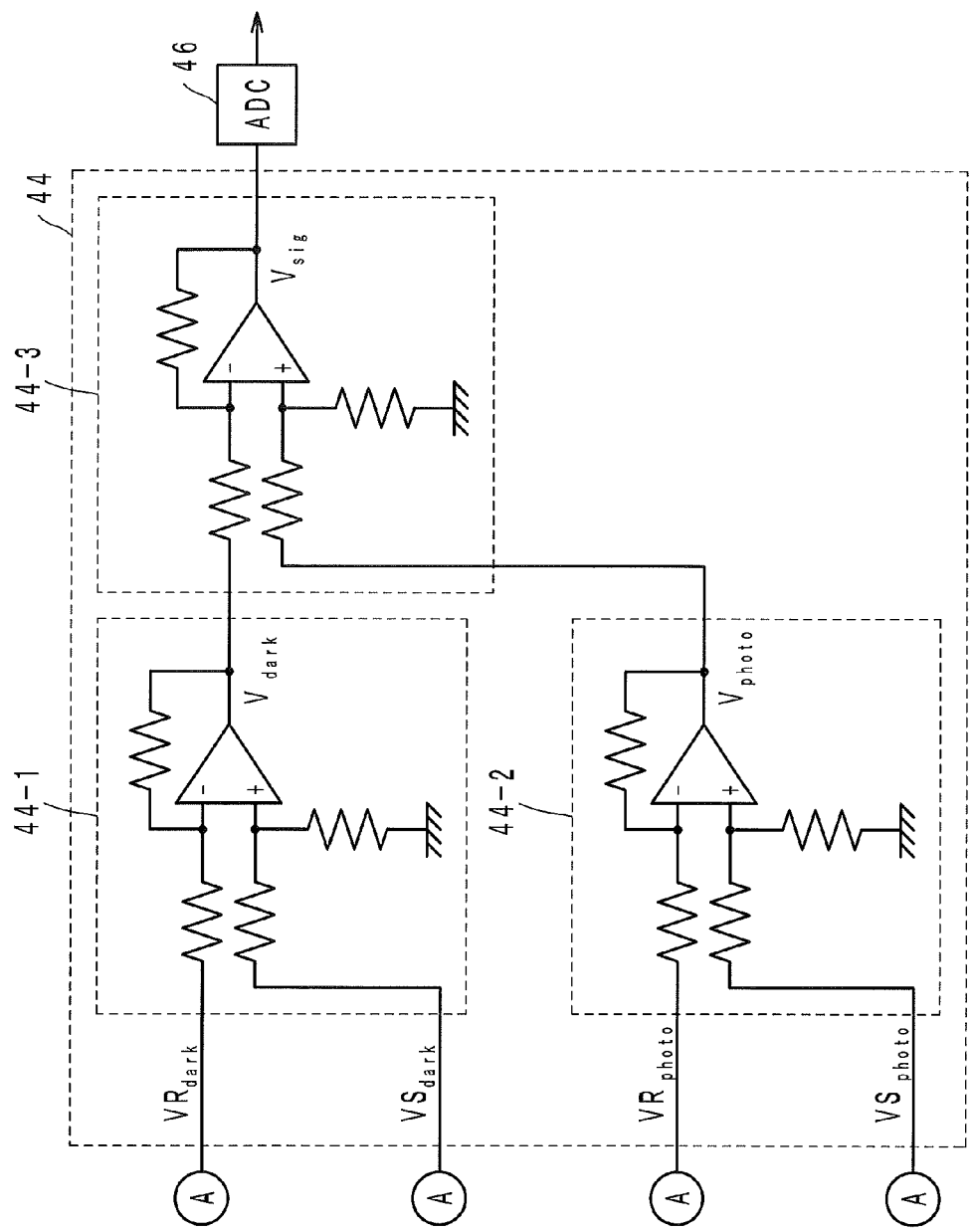
FIG. 5B is a circuit diagram showing details of the configuration of a subtracting circuit shown in FIG. 3 and FIG. 4A.

Hereinafter, details of the OLED-PH 17 are described. FIG. 3 is a first block diagram showing details of the configuration of the OLED-PH 17 and surrounding components. FIG. 4A is a second block diagram showing details of the configuration of the OLED-PH 17 and surrounding components. FIG. 4B is a graph showing the output value (output current) of a photodetector 41 shown in FIG. 4A with respect to the quantity of incident light. FIG. 5A is a circuit diagram showing details of the configuration of a photodetector 41A, an integrating circuit 42A, and a S/H circuit 43A shown in FIG. 3 and FIG. 4A. FIG. 5B is a circuit diagram showing details of the configuration of a subtracting circuit 44 shown in FIG. 3 and FIG. 4A. FIG. 5C is a vertical cross-sectional view showing details of the configuration of the photodetector 41A shown in FIG. 3 and FIG. 4A.

First, referring to FIG. 3 and FIG. 4A, the OLED-PH 17 includes light-emitting points A1 to A4, B1 to B4, C1 to C4 . . . and drive circuits 6A1 to 6A4, 6B1 to 6B4, 6C1 to 6C4 . . . on an OLED substrate 52. The light-emitting points A1 to A4, B1 to B4, C1 to C4 . . . are grouped into a plurality of groups A, B, C . . . . The group A includes, for example, four light-emitting points A1 to A4. Likewise, the groups B, C . . . include light-emitting points B1 to B4, C1 to C4 . . . , respectively.

The drive circuit 6A1 is connected to the light-emitting point A1. Likewise, the drive circuits 6A2 to 6A4, 6B1 to 6B4, 6C1 to 6C4 . . . are connected to the light-emitting points A2 to A4, B1 to B4, C1 to C4 . . . , respectively. Each of these drive circuits 6A1 to 6A4, 6B1 to 6B4, 6C1 to 6C4 . . . includes a current source and a switch (switching element such as TFT). Note that only the current source and the switch of the drive circuits 6A1 are shown in the drawing.

The current sources of the drive circuits 6A1 to 6A4, 6B1 to 6B4, 6C1 to 6C4 . . . are respectively supplied with current control signals ICSa1 to ICSa4, ICSb1 to ICSb4, ICSc1 to ICSc4 . . . output from the control circuit 37. The current control signals ICSa1 to ICSa4, ICSb1 to ICSb4, ICSc1 to ICSc4 are driving signals for driving the light-emitting points A1 to A4, B1 to B4, C1 to C4 . . . , respectively. Each of the current sources outputs an electric current of a value which is based on a corresponding current control signal.

The switches of the drive circuits 6A1 to 6A4, 6B1 to 6B4, 6C1 to 6C4 . . . are respectively supplied with switching signals ISa1 to ISa4, ISb1 to ISb4, ISc1 to ISc4 . . . output from the control circuit 37. The switches are turned on/off based on corresponding switching signals. The switching signals are generated based on image signals which are to be printed out by the image forming apparatus 1.

In this structure, for example, the current generated by the current source is supplied to the light-emitting point A1 while the current source of the drive circuit 6A1 generates a current based on the current control signal ICSa1 and the switch of the drive circuit 6A1 is kept on based on the switching signal ISa1. Likewise, the other drive circuits 6A2 to 6A4, 6B1 to 6B4, 6C1 to 6C4 . . . supply currents to corresponding light-emitting points A2 to A4, B1 to B4, C1 to C4 . . . based on corresponding current control signals and switching signals.

The OLED substrate 52 is further provided with a set of components for the group A, including a photodetector 41A, an integrating circuit 42A, and a S/H circuit 43A. Likewise, the OLED substrate 52 is further provided with sets of components for the groups B, C . . . , including a set of a photodetector 41B, an integrating circuit 42B, and a S/H circuit 43B, a set of a photodetector 41C, an integrating circuit 42C, and a S/H circuit 43C, and so on.

Each of the photodetectors 41A, 41B, 41C . . . is realized by a photodiode which is configured to detect the quantity of light radiated at the light-emitting point A2 to A4, B1 to B4, C1 to C4 . . . of the corresponding group A, B, C . . . , and which has a linear input-output characteristic such as shown in FIG. 4B. The photodetectors 41A, 41B, 41C . . . respectively receive and detect light emitted from the light-emitting points A1 to A4, B1 to B4, C1 to C4 . . . of the groups A, B, C . . . , and output current values $I_{PDA}$, $I_{PDB}$, $I_{PDC}$ . . . which depend on the quantity of received light to the integrating circuits 42A, 42B, 42C . . . , respectively.

The integrating circuits 42A, 42B, 42C . . . respectively integrate the outputs of the photodetectors 41A, 41B, 41C . . . of the previous stage. The S/H circuits 43A, 43B, 43C . . . respectively store the outputs of the integrating circuits 42A, 42B, 42C . . . of the previous stage.

The OLED substrate 52 is further provided with a subtracting circuit 44 which is shared among the groups A, B, C . . . . The subtracting circuit 44 carries out a subtracting operation using the outputs of the S/H circuits 43A, 43B, 43C . . . of the groups A, B, C . . . to output photodetection signals A, B, C . . . .

The control circuit 37 corrects the quantity of light emitted from corresponding light-emitting points A1 to A4, B1 to B4, C1 to C4 . . . based on the photodetection signals A, B, C . . . for respective ones of the light-emitting points which are obtained from the subtracting circuit 44.

Next, details of the configuration of the groups A, B, C . . . shown in FIG. 3 and FIG. 4A are described. Note that the groups A, B, C . . . have the same configuration in details, and therefore, among others, the configuration of the group A is described in the following section.

Firstly, in FIG. 5A, the photodetector 41A is a thin-film photodiode such as shown in FIG. 5C. In FIG. 5C, a thin film transistor (TFT) which is a constituent of the drive circuit 6A1, or the like, is provided on the OLED substrate 52. This TFT is, more specifically, a LTPS-TFT (Low-Temperature Poly Silicon TFT). On the thus-configured OLED substrate 52, a PIN photodiode (PIN-PD) in which amorphous silicon (a-Si) is used is formed by CVD (Chemical Vapor Deposition) as the photodetector 41A. Further, on the OLED substrate 52, OLEDs which serve as light-emitting points A1 to A4, or the like, are formed by deposition. In the present embodiment, the TFT and the PIN-PD are arranged so as not to overlap with the light-emitting surface of the OLED when viewed in plan in the normal direction of the light-emitting surface of the OLED (i.e., light-emitting direction).

Again refer to FIG. 5A. The integrating circuit 42A includes an operational amplifier 91, a plurality of capacitors CG1 to CG4, a switch 92, and a switch 93 as shown in FIG. 5A. The integrating circuit 42A integrates the output of the photodetector 41A.

The inverted input terminal (−) of the operational amplifier 91 is connected to the above-described photodetector 41A. One end of each of the capacitors CG1 to CG4 is connected to the inverted input terminal (−). The other end of each of the capacitors CG1 to CG4 is connected to the switch 93.

The capacitors CG1 to CG4 are provided for the purpose of gain adjustment and have different capacitance values. In this embodiment, the capacitance values of the capacitors CG1 to CG4 are as follows:

CG1: 1 pF
CG2: 0.5 pF
CG3: 0.25 pF
CG4: 0.125 pF

The switch 93 is also connected to the output terminal of the operational amplifier 91. The switch 93 selects any one of the capacitors CG1 to CG4 based on a selection signal SELa supplied from the control circuit 37 and connects the selected capacitor in parallel between the inverted input terminal (−) and the output terminal.

The switch 92 is located between the inverted input terminal (−) and the output terminal of the operational amplifier 91. The switch 92 makes or breaks the connection between the inverted input terminal (−) and the output terminal according to a reset signal RSTa supplied from the control circuit 37. When the switch 92 makes the connection, the voltages accumulated in the capacitors CG1 to CG4 are reset to 0 V.

The non-inverted input terminal (+) of the operational amplifier 91 is grounded.

The output terminal of the operational amplifier 91 is connected to the S/H circuit 43A. The output voltage $V_{OUT}$ of the operational amplifier 91 is calculated by expression (1) shown below:

$$V_{OUT} = I_{PDA} \times T_{PHOTO} / C_S \qquad (1)$$

where $C_S$ is the capacitance of the selected capacitor, $I_{PDA}$ is the output current of the photodetector 41A, and $T_{PHOTO}$ is the integral time (the light-emitting time of the light-emitting point). The output voltage $V_{OUT}$ is output as a photodetection signal A.

The other integrating circuits 42B, 42C . . . have the same structure and are controlled in the same way as the integrating circuit 42A, and output photodetection signals B, C . . . in accordance with the input currents $I_{PDB}$, $I_{PDC}$ . . . , respectively.

In order to improve the detection accuracy of the photodetection signals A, B, C . . . , it is necessary to raise the voltages $V_{OUT}$ of the photodetection signals A, B, C . . . such that a sufficient dynamic range is ensured. However, for example, the quantity of light incident on the photodetector 41A depends on the quantities of light emitted from the light-emitting points A1 to A4 and other factors. Even if the quantities of light emitted from the light-emitting points A1 to A4 are equal to one another, the current value $I_{PDA}$ of the photodetector 41A may be different for each of the light-emitting points A1 to A4.

Therefore, in this embodiment, prior to an ordinary optical writing process, a gain setting operation, which will be described later, is carried out. In the gain setting operation, one of the capacitors CG1 to CG4 is selected in accordance with the quantity of light incident on the photodetector 41A to set a gain fixedly for amplification of the photodetection signal A in regard to each of the light-emitting points A1 to A4. Thereby, a sufficient dynamic range can be ensured. With respect to the other photodetectors 41B, 41C . . . , the same operation is carried out.

The S/H circuit 43A includes four S/H circuits 43A-1 to 43A-4. The S/H circuit 43A-1 includes a capacitor $VR_{dark}$ which is configured to hold the photodetection signal A of the integrating circuit 42A of the previous stage, a voltage follower, and two switches, one preceding the voltage follower and the other succeeding the voltage follower. The S/H circuit 43A-2 includes a capacitor $VS_{dark}$ which is configured to hold the photodetection signal A of the integrating circuit 42A of the previous stage, a voltage follower, and two switches, one preceding the voltage follower and the other succeeding the voltage follower. The S/H circuit 43A-3 includes a capacitor $VR_{photo}$ which is configured to hold the photodetection signal A of the integrating circuit 42A of the previous stage, a voltage follower, and two switches, one preceding the voltage follower and the other succeeding the voltage follower. The S/H circuit 43A-4 includes a capacitor $VS_{photo}$ which is configured to hold the photodetection signal A of the integrating circuit 42A of the previous stage, a voltage follower, and two switches, one preceding the voltage follower and the other succeeding the voltage follower. Here, the succeeding switches are arranged such that the values held by the capacitors of the other groups are not simultaneously output to the subtracting circuit 44 that is shared among the groups.

Next, refer to FIG. 5B. The subtracting circuit 44 is a two-staged subtracting circuit. The first stage includes a subtracting circuit 44-1 and a subtracting circuit 44-2. The second stage includes a subtracting circuit 44-3.

Although details of the process carried out by the subtracting circuits 44-1 to 44-3 will be described later, the subtracting circuits 44-1, 44-2 of the first stage are provided for the purpose of removing reset noise that occurs in resetting the capacitors of the integrating circuit 42A, and the subtracting circuit 44-3 of the second stage is provided for the purpose of removing an dark output.

The OLED-PH 17 includes an ADC 46 and an averaging circuit 48. The ADC 46 is provided at a succeeding stage of the subtracting circuit 44 and is configured to convert an analog output value of the subtracting circuit 44-3 to a digital value.

The averaging circuit 48 averages a plurality of output values (in the present embodiment, eight output values) from the ADC 46. Specifically, the averaging circuit 48 includes, for example, eight registers. The averaging circuit 48 records the eight output values from the ADC 46 and adds these values together. After the addition, the averaging circuit 48 divides the resultant value by eight for example, by removing the low-order 3 bits. Note that the averaging circuit 48 may average at least two output values. Although the averaging circuit 48 is shown as part of the control circuit 37 in FIG. 4A, the averaging circuit 48 may be provided outside the control circuit 37.

In the OLED-PH 17 that has the above-described configuration, in an ordinary optical writing process, control signals. (e.g., horizontal synchronization signals, clock signals, etc.) and image data are transmitted from the control circuit 37 to the OLED-PH 17. In the OLED-PH 17, the drive circuits 6A1 to 6A4, 6B1 to 6B4, 6C1 to 6C4 . . . control the lighting-on (ON) and lighting-off (OFF) of the light-emitting points A1 to A4, B1 to B4, C1 to C4 . . . based on the input image data. As a result, an electrostatic latent image is formed on the peripheral surface of each of the charged photoreceptor drums 31 (see FIG. 2A).

The quantity of light (i.e., the intensity of light) emitted from the light-emitting points A1 to A4, B1 to B4, C1 to C4 . . . is controlled prior to the optical writing process. For example, when the image forming apparatus 1 is powered on, light quantity set values are transferred from a memory section 50, which is realized by a non-volatile memory, for example, to storage sections (e.g., registers) provided in the drive circuits 6A1 to 6A4, 6B1 to 6B4, 6C1 to 6C4 . . . , and the transferred values are stored in the storage sections. Based on these light quantity set values, each of the light-emitting points A1 to A4, B1 to B4, C1 to C4 . . . emits light of a desired light emission quantity. Note that although the memory section 50 is shown as being provided outside the control circuit 37, the memory section 50 may be provided inside the control circuit 37.

Control of the quantity of light emitted from the light-emitting points A1 to A4, B1 to B4, C1 to C4 . . . requires light quantity correction. Operations of light quantity detection and correction which are to be carried out to this end will be described later.

In the OLED-PH 17, the photodetectors 41A, 41B, 41C . . . have a temperature dependence. Further, the integrating circuits 42A, 42B, 42C . . . and the S/H circuits 43A, 43B, 43C . . . , which are readout circuits, also have a temperature dependence as the photodetectors 41A, 41B, 41C do. Specifically, as the temperatures of the photodetectors 41A, 41B, 41C . . . , the integrating circuits 42A, 42B, 42C . . . , and the S/H circuits 43A, 43B, 43C increase, the output values from these components are greater than those corresponding to the emitted light quantities actually detected by the photodetectors 41A, 41B, 41C . . . . On the other hand, as the temperatures of the photodetectors 41A, 41B, 41C . . . , the integrating circuits 42A, 42B, 42C . . . , and the S/H circuits 43A, 43B, 43C decrease, the output values from these components are smaller than those corresponding to the emitted light quantities actually detected by the photodetectors 41A, 41B, 41C . . . . In view of such, in the OLED-PH 17, the temperatures of the photodetectors 41A, 41B, 41C . . . are determined, and the photodetection signals A, B, C . . . are corrected based on the temperatures. In the following section, such an operation is referred to as "temperature correction operation".

In the temperature correction operation, the control circuit 37 determines the temperatures of the photodetectors 41A, 41B, 41C . . . based on the photodetection signals A, B, C . . . which are output from the integrating circuits 42A, 42B, 42C . . . while the light-emitting points A1 to A4, B1 to B4, C1 to C4 . . . are OFF. Hereinafter, photodetection signals A, B, C . . . which are output from the integrating circuits 42A, 42B, 42C . . . while the light-emitting points A1 to A4, B1 to B4, C1 to C4 . . . are OFF are generically referred to as "dark-time output signals". The S/H circuits 43A, 43B, 43C . . . , the subtracting circuit 44, and the averaging circuit 48 extract photodiode dark currents from the dark-time output signals. Details of the temperature correction operation will be described later.

General Procedure of Operation of OLED-PH

Next, the operation of the OLED-PH 17 is described with reference to the drawings. FIG. 6 is a flowchart of an operation carried out by the control circuit 37 of the OLED-PH 17.

This process is started when the image forming apparatus 1 is powered on. The control circuit 37 determines whether or not the temperature correction operation is to be carried out (step S01). At step S01, specifically, the control circuit 37 determines whether or not a predetermined time period has passed since the last temperature correction operation. The predetermined time period is, for example, several tens of minutes. Note that, however, the predetermined time period is not limited to several tens of minutes. Note that, immediately after being powered on, the control circuit 37 determines that the temperature correction operation is to be carried out even if the predetermined time period has not passed yet. If the temperature correction operation is to be carried out, the process proceeds to step S02. If the temperature correction operation is not to be carried out, the process proceeds to step S03.

If the temperature correction operation is to be carried out, the control circuit 37 carries out a temperature correction operation which will be described later. When the temperature correction operation is finished, the process returns to step S01.

If the temperature correction operation is not to be carried out, the control circuit 37 determines whether or not the gain setting operation is to be carried out (step S03). At step S03, specifically, the control circuit 37 determines whether or not a predetermined time period has passed since the last gain setting operation. The predetermined time period is, for example, twelve hours. Note that, however, the predetermined time period is not limited to twelve hours. Note that, immediately after being powered on, the control circuit 37 determines that the gain setting operation is to be carried out even if the predetermined time period has not passed yet. If the gain setting operation is to be carried out, the process proceeds to step S04. If the gain setting operation is not to be carried out, the process proceeds to step S05.

If the gain setting operation is to be carried out, the control circuit 37 carries out a gain setting operation which will be described later (step S04). When the gain setting operation is finished, the process returns to step S01.

If the gain setting operation is not to be carried out, the control circuit 37 determines whether or not the light quantity correction operation is to be carried out (step S05). At step S05, specifically, the control circuit 37 determines whether or not a predetermined time period has passed since the last light quantity correction operation. The predetermined time period is, for example, several tens of minutes. Note that, however, the predetermined time period is not limited to several tens of minutes. Note that, immediately after being powered on, the control circuit 37 determines that the light quantity correction operation is to be carried out even if the predetermined time period has not passed yet. If the light quantity correction operation is to be carried out, the process proceeds to step S06. If the light quantity correction operation is not to be carried out, the process proceeds to step S07.

If the light quantity correction operation is to be carried out, the control circuit 37 carries out a light quantity correction operation which will be described later (step S06). When the light quantity correction operation is finished, the process returns to step S01.

If the light quantity correction operation is not to be carried out, the control circuit 37 determines whether or not the process is to be ended (step S07). At step S07, specifically, the control circuit 37 determines, for example, whether or not the image forming apparatus 1 is powered off. If the process is not to be ended, the process returns to step S01. The operations of step S01 through step S07 are repeated till the image forming apparatus 1 is powered off.

Temperature Correction Operation

Figure 7:
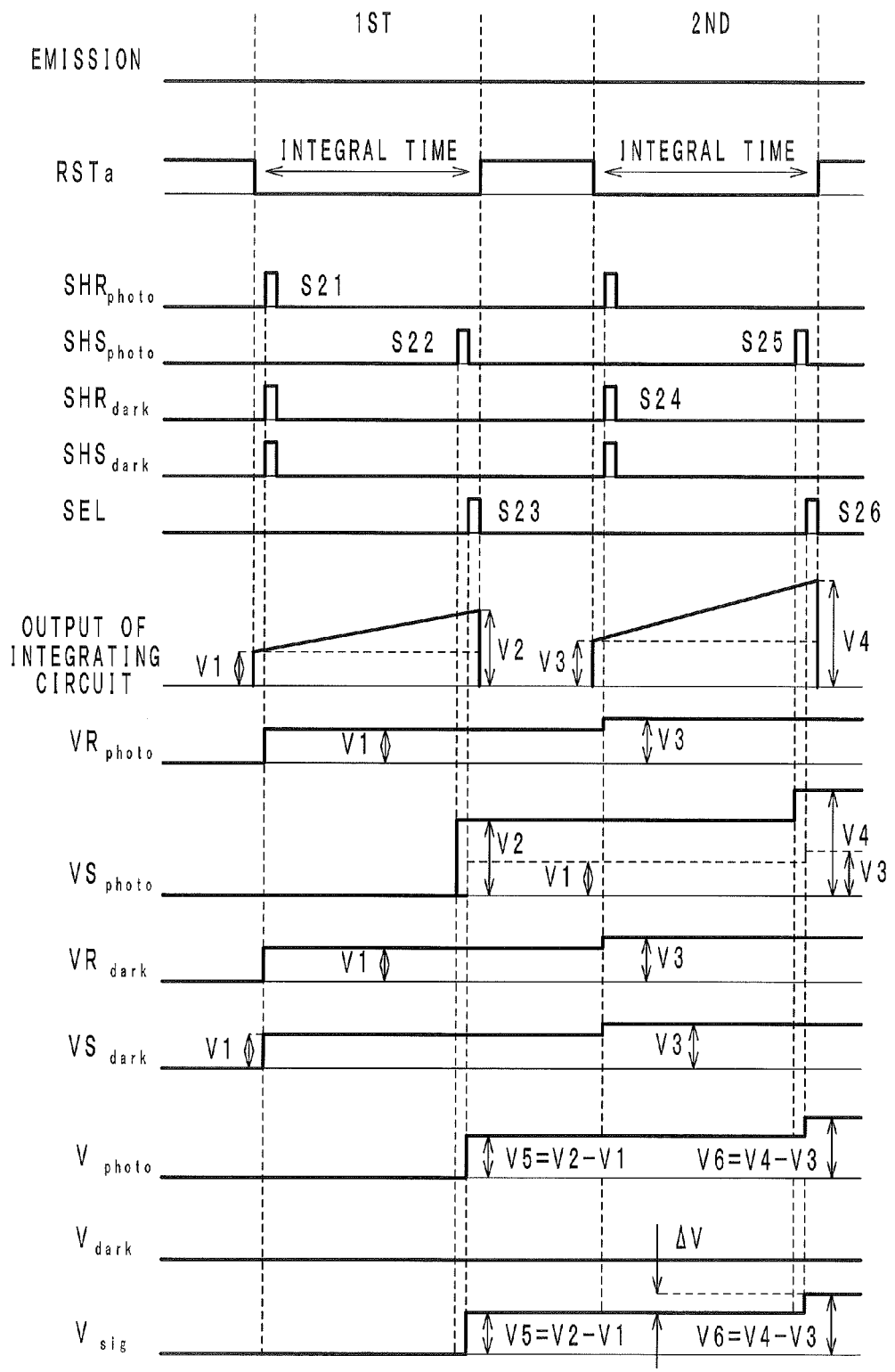
FIG. 7 is a timing chart of a temperature correction operation.

Next, the temperature correction operation of step S02 is described with reference to the drawings. FIG. 7 is a timing chart of the temperature correction operation.

In the temperature correction operation of the present embodiment, the control circuit 37 determines the temperatures of the photodetectors 41A, 41B, 41C . . . based on the magnitude of photodiode dark currents included in the current values $I_{PDA}, I_{PDB}, I_{PDC}$ . . . which are output from the photodetectors 41A, 41B, 41C . . . while the light-emitting points A1 to A4, B1 to B4, C1 to C4 . . . are OFF. Specifically, in the temperature correction operation, the OLED-PH 17 allows the integrating circuits 42A, 42B, 42C . . . to respectively integrate the current values $I_{PDA}, I_{PDB}, I_{PDC}$ . . . which are output from the photodetectors 41A, 41B, 41C . . . while the light-emitting points A1 to A4, B1 to B4, C1 to C4 . . . are OFF. Then, the OLED-PH 17 extracts photodiode dark currents from the photodetection signals A, B, C (dark-time output signals) output from the integrating circuits 42A, 42B, 42C . . . . Therefore, it is necessary to remove noise, exclusive of the photodiode dark currents, from the dark-time output signals. The noise components included in the dark-time output signals are shown below.

(1) Dark Current Shot Noise

Dark current shot noise refers to noise which is attributed to a dark current produced in a photodiode and which is an irregularly fluctuating component of the dark current. Thus, the dark current shot noise is random noise.

(2) Reset Noise

Reset noise refers to noise which occurs after a voltage is applied to a capacitance via a switch and the switch is turned off and which is produced in a sampling circuit or the like. The reset noise is random noise.

(3) Amplification Noise

Amplification noise refers to noise which is produced in an amplification circuit. The amplification noise is random noise.

(4) Optical Shot Noise

Optical shot noise refers to noise which occurs because light has the properties of a particle called photon so that, even if the light intensity is constant, the number of photons of light incident on a photodiode within one cycle of the accumulation time is not always the same but fluctuates. Thus, the optical shot noise is random noise.

(5) Photodiode Dark Current

Photodiode dark current refers to noise which is attributed to a dark current variation in each pixel and which has such a characteristic that it has a temperature dependence while the noise signal voltage is proportional to the accumulation time. The photodiode dark current is fixed pattern noise.

(6) Photodiode Sensitivity Variation

Photodiode sensitivity variation refers to noise which is produced due to the variation of the sensitivity of a photodiode. The photodiode sensitivity variation is fixed pattern noise.

The optical shot noise and the photodiode sensitivity variation are to be produced when there is light incident on the photodetectors 41A to 41C. The dark current shot noise, reset noise, amplification noise, and photodiode dark current are to be produced both when there is light incident on the photodetectors 41A to 41C and when there is no light incident on the photodetectors 41A to 41C. In the temperature correction operation, the temperatures of the photodetectors 41A, 41B, 41C . . . are determined based on the dark-time output signals. Therefore, the optical shot noise and the photodiode sensitivity variation are negligible. The dark current shot noise is much smaller than the photodiode dark current and is also negligible.

As understood from the foregoing, the photodiode dark current can be extracted by removing the reset noise and the amplification noise from the dark-time output signal. Hereinafter, the temperature correction operation is described in more detail.

Prior to the start of the temperature correction operation, the control circuit 37 sends the selection signal SELa to the switch 93 to select the capacitor CG4 that has the smallest capacitance. Since the dark-time output signal is very small, improving the detection accuracy of the dark-time output signal requires further increasing the voltage value $V_{OUT}$ of the dark-time output signal such that a sufficient dynamic range is ensured. Therefore, the control circuit 37 selects the capacitor CG4 for the purpose of gain setting which is suitable to a signal level of 0 V to 0.25 V.

In the temperature correction operation, the control circuit 37 obtains more than once the output value $V_{sig}$ that has been obtained by removing the reset noise from a dark-time output signal. In the present embodiment, the control circuit 37 obtains eight output values $V_{sig}$.

First, the control circuit 37 obtains the first output value $V_{sig}$ at step S21 through step S23. Specifically, at step S21, the control circuit 37 does not allow emission of the light-emitting points A1 to A4. Thereafter, the control circuit 37 sends the control signal RSTa to cancel the reset state of the integrating circuit 42A so that the output of the photodetector 41A can be accumulated in the capacitor CG4 of the integrating circuit 42A. At the same time, the control circuit 37 sends a control signal $SHR_{photo}$ to close the switch on the preceding stage side of the S/H circuit 43A-3 so that the output value of the integrating circuit 42A (at the start of integration) is recorded in the capacitor $VR_{photo}$; the control circuit 37 sends a control signal $SHR_{dark}$ to close the switch on the preceding stage side of the S/H circuit 43A-1 so that the output value of the integrating circuit 42A (at the start of integration) is recorded in the capacitor $VR_{dark}$; and the control circuit 37 sends a control signal $SHS_{dark}$ to close the switch on the preceding stage side of the S/H circuit 43A-2 so that the output value of the integrating circuit 42A (at the start of integration) is recorded in the capacitor $VS_{dark}$. As a result, voltage value V1 is applied to the capacitors $VR_{photo}$, $VR_{dark}$, $VS_{dark}$. Thereafter, the control circuit 37 sends the control signal $SHR_{photo}$ to open the switch on the preceding stage side of the S/H circuit 43A-3, sends the control signal $SHR_{dark}$ to open the switch on the preceding stage side of the S/H circuit 43A-1, and sends the control signal $SHS_{dark}$ to open the switch on the preceding stage side of the S/H circuit 43A-2.

At the subsequent step S22, after a predetermined time period has passed since the start of integration (i.e., after passage of the integral time) while the light-emitting points A1 to A4 are OFF, the control circuit 37 sends a control signal $SHS_{photo}$ to close the switch on the preceding stage side of the S/H circuit 43A-4 and records the output value of the integrating circuit 42A (after passage of the integral time) in the capacitor $VS_{photo}$. As a result, voltage value V2 is applied to the capacitor $VS_{photo}$. Thereafter, the control circuit 37 sends the control signal $SHS_{photo}$ to open the switch on the preceding stage side of the S/H circuit 43A-4.

At the subsequent step S23, the control circuit 37 sends a control signal SEL to close the switches on the succeeding stage side of the S/H circuits 43A-1 to 43A-4. Accordingly, the subtracting circuit 44-2 subtracts voltage value V1 held by the capacitor $VR_{photo}$ from voltage value V2 held by the capacitor $VS_{photo}$. Here, voltage value V1 is an output value of the integrating circuit 42A which is obtained at the start of integration while the light-emitting points A1 to A4 are OFF, and is formed by the reset noise. Voltage value V2 is an output value of the integrating circuit 42A which is obtained after the integral time has passed since the start of integration while the light-emitting points A1 to A4 are OFF, and is formed by the reset noise, the amplification noise, and the photodiode dark current. Thus, by the above subtraction, an output value $V_{photo}$ of the photodetector 41A from which the reset noise has been removed is obtained. The output value $V_{photo}$ is output to the subtracting circuit 44-3 of the succeeding stage. The output value $V_{photo}$ is voltage value V5 (=V2−V1).

Further, the subtracting circuit 44-1 subtracts voltage value V1 held by the capacitor $VR_{dark}$ from voltage value V1 held by the capacitor $VS_{dark}$. Therefore, as a result of this subtraction, the output value $V_{dark}$ of the subtracting circuit 44-1 is zero (0). This result is output to the subtracting circuit 44-3 of the succeeding stage.

The subtracting circuit 44-3 subtracts the output value $V_{dark}$ (voltage value 0) from the output value $V_{photo}$ (voltage value V5) and outputs the output value $V_{sig}$ (voltage value V5) to the ADC 46 of the succeeding stage. The ADC 46 outputs the output value $V_{sig}$ (voltage value V5) to the control circuit 37. As a result, the control circuit 37 obtains the first output value $V_{sig}$. The control circuit 37 writes the first output value $V_{sig}$ in the first register of the averaging circuit 48. Then, the control circuit 37 sends the control signal RSTa to reset the integrating circuit 42A.

Then, the control circuit 37 obtains the second output value $V_{sig}$ in step S24 through step S26. In step S24 through step S26, the control circuit 37 carries out the same operations as those of step S21 through step S23. Specifically, at step S24, the control circuit 37 does not allow emission of the light-emitting points A1 to A4. Thereafter, the control circuit 37 sends the control signal RSTa to cancel the reset state of the integrating circuit 42A so that the output of the photodetector 41A can be accumulated in the capacitor CG4 of the integrating circuit 42A. At the same time, the control circuit 37 sends the control signal $SHR_{photo}$ to close the switch on the preceding stage side of the S/H circuit 43A-3 so that the output value of the integrating circuit 42A (at the start of integration) is recorded in the capacitor $VR_{photo}$; the control circuit 37 sends the control signal $SHR_{dark}$ to close the switch on the preceding stage side of the S/H circuit 43A-1 so that the output value of the integrating circuit 42A (at the start of integration) is recorded in the capacitor $VR_{dark}$; and the control circuit 37 sends the control signal $SHS_{dark}$ to close the switch on the preceding stage side of the S/H circuit 43A-2 so that the output value of the integrating circuit 42A (at the start of integration) is recorded in the capacitor $VS_{dark}$. As a result, voltage value V3 is applied to the capacitors $VR_{photo}$, $VR_{dark}$, $VS_{dark}$. Thereafter, the control circuit 37 sends the control signal $SHR_{photo}$ to open the switch on the preceding stage side of the S/H circuit 43A-3, sends the control signal $SHR_{dark}$ to open the switch on the preceding stage side of the S/H circuit 43A-1, and sends the control signal $SHS_{dark}$ to open the switch on the preceding stage side of the S/H circuit 43A-2.

At the subsequent step S25, after a predetermined time period has passed since the start of integration (i.e., after passage of the integral time) while the light-emitting points A1 to A4 are OFF, the control circuit 37 sends the control signal $SHS_{photo}$ to close the switch on the preceding stage side of the S/H circuit 43A-4 and records the output value of the integrating circuit 42A (after passage of the integral time) in the capacitor $VS_{photo}$. As a result, voltage value V4 is applied to the capacitor $VS_{photo}$. Thereafter, the control circuit 37 sends the control signal $SHS_{photo}$ to open the switch on the preceding stage side of the S/H circuit 43A-4.

At the subsequent step S26, the control circuit 37 sends the control signal SEL to close the switches on the succeeding stage side of the S/H circuits 43A-1 to 43A-4. Accordingly, the subtracting circuit 44-2 subtracts voltage value V3 held by the capacitor $VR_{photo}$ from voltage value V4 held by the capacitor $VS_{photo}$. Here, voltage value V4 is an output value of the integrating circuit 42A which is obtained at the start of integration while the light-emitting points A1 to A4 are OFF, and is formed by the reset noise. Voltage value V3 is an output value of the integrating circuit 42A which is obtained after the integral time has passed since the start of integration while the light-emitting points A1 to A4 are OFF, and is formed by the reset noise, the amplification noise, and the photodiode dark current. Thus, by the above subtraction, an output value $V_{photo}$ of the photodetector 41A from which the reset noise has been removed is obtained. The output value $V_{photo}$ is output to the subtracting circuit 44-3 of the succeeding stage. The output value $V_{photo}$ is voltage value V6 (=V4-V3).

Further, the subtracting circuit 44-1 subtracts voltage value V3 held by the capacitor $VR_{dark}$ from voltage value V3 held by the capacitor $VS_{dark}$. Therefore, as a result of this subtraction, the output value $V_{dark}$ of the subtracting circuit 44-1 is zero (0). This result is output to the subtracting circuit 44-3 of the succeeding stage.

The subtracting circuit 44-3 subtracts the output value $V_{dark}$ (voltage value 0) from the output value $V_{photo}$ (voltage value V6) and outputs the output value $V_{sig}$ (voltage value V6) to the ADC 46 of the succeeding stage. The ADC 46 outputs the output value $V_{sig}$ (voltage value V6) to the control circuit 37. As a result, the control circuit 37 obtains the second output value $V_{sig}$. The control circuit 37 writes the second output value $V_{sig}$ in the second register of the averaging circuit 48. Then, the control circuit 37 sends the control signal RSTa to reset the integrating circuit 42A.

Thereafter, the control circuit 37 repeats six times the same operations as those of step S21 through step S23 or step S24 through step S26 to obtain the third through eighth output values $V_{sig}$.

Here, the first through eighth output values $V_{sig}$ include, in addition to the photodiode dark current, the amplification noise that is random noise which randomly varies to positive or negative values. Therefore, as shown in FIG. 7, the difference between voltage value V5 (first output value $V_{sig}$) and voltage value V6 (second output value $V_{sig}$) is $\Delta$ V. The averaging circuit 48 outputs the average $V_{ave}$ of the first through eighth output values $V_{sig}$ to the control circuit 37. Specifically, the averaging circuit 48 adds together the output values $V_{sig}$ recorded in the first through eighth registers, and divides the resultant value by eight for example, by removing the low-order 3 bits, thereby obtaining the average $V_{ave}$. By averaging, the amplification noise, which is random noise, is removed from the first through eighth output values $V_{sig}$. The control circuit 37 accepts the obtained average $V_{ave}$ as the magnitude of the photodiode dark current.

Then, the control circuit 37 determines the temperatures of the photodetectors 41A, 41B, 41C . . . based on the magnitude of the photodiode dark current (average $V_{ave}$). To this end, a table as shown by Table 1 below is preliminarily stored in the memory section 50.

TABLE 1

| (d) PD Dark Current (PDDC) | Temperature |
|---|---|
| 8.0 mV ≤ PDDC | 50° C. |
| 6.96 mV ≤ PDDC < 8.0 mV | 48° C. |
| 6.06 mV ≤ PDDC < 6.96 mV | 46° C. |
| 5.28 mV ≤ PDDC < 6.06 mV | 44° C. |
| 4.59 mV ≤ PDDC < 5.28 mV | 42° C. |
| 4.0 mV ≤ PDDC < 4.59 mV | 40° C. |
| 3.48 mV ≤ PDDC < 4.0 mV | 38° C. |
| 3.03 mV ≤ PDDC < 3.48 mV | 36° C. |
| 2.64 mV ≤ PDDC < 3.03 mV | 34° C. |
| 2.3 mV ≤ PDDC < 2.64 mV | 32° C. |
| 2.0 mV ≤ PDDC < 2.3 mV | 30° C. |
| 1.74 mV ≤ PDDC < 2.0 mV | 28° C. |
| 1.52 mV ≤ PDDC < 1.74 mV | 26° C. |
| 1.32 mV ≤ PDDC < 1.52 mV | 24° C. |
| 1.15 mV ≤ PDDC < 1.32 mV | 22° C. |
| 1.0 mV ≤ PDDC < 1.15 mV | 20° C. |
| 0.87 mV ≤ PDDC < 1.0 mV | 18° C. |
| 0.76 mV ≤ PDDC < 0.87 mV | 16° C. |
| 0.66 mV ≤ PDDC < 0.76 mV | 14° C. |
| 0.57 mV ≤ PDDC < 0.66 mV | 12° C. |
| 0.5 mV ≤ PDDC < 0.57 mV | 10° C. |
| 0.44 mV ≤ PDDC < 0.5 mV | 8° C. |
| 0.38 mV ≤ PDDC < 0.44 mV | 6° C. |
| 0.33 mV ≤ PDDC < 0.38 mV | 4° C. |
| 0.29 mV ≤ PDDC < 0.33 mV | 2° C. |
| 0.25 mV ≤ PDDC < 0.29 mV | 0° C. |

The table shows the relationship between the magnitude of the photodiode dark current and the temperatures of the photodetectors 41A, 41B, 41C . . . . As previously described, the photodiode dark current has the temperature dependence. Specifically, the photodiode dark current increases as the temperature increases. Therefore, the table shows higher temperatures as the magnitude of the photodiode dark current increases.

The control circuit 37 refers to Table 1 to determine the temperature of the photodetector 41A based on the magnitude of the photodiode dark current (average $V_{ave}$). For example, when the magnitude of the photodiode dark current (average $V_{ave}$) is 2.2 mV, the control circuit 37 determines that the temperature of the photodetector 41A is 30°

C., which corresponds to the range of "2. mV≤PDDC<2.3 mV". Note that the control circuit 37 may determine the temperature of the photodetector 41A by an operation based on an interpolation function (interpolation operation), rather than using the table.

In a light quantity correction operation which will be described later, the control circuit 37 corrects the photodetection signal A based on the temperature of the photodetector 41A. To this end, a table as shown by Table 2 below is preliminarily stored in the memory section 50.

TABLE 2

| Temperature | Coefficient |
|---|---|
| 50° C. | 0.85 |
| 48° C. | 0.86 |
| 46° C. | 0.87 |
| 44° C. | 0.88 |
| 42° C. | 0.89 |
| 40° C. | 0.90 |
| 38° C. | 0.91 |
| 36° C. | 0.92 |
| 34° C. | 0.93 |
| 32° C. | 0.94 |
| 30° C. | 0.95 |
| 28° C. | 0.96 |
| 26° C. | 0.97 |
| 24° C. | 0.98 |
| 22° C. | 0.99 |
| 20° C. | 1.00 |
| 18° C. | 1.01 |
| 16° C. | 1.02 |
| 14° C. | 1.03 |
| 12° C. | 1.04 |
| 10° C. | 1.05 |
| 8° C. | 1.06 |
| 6° C. | 1.07 |
| 4° C. | 1.08 |
| 2° C. | 1.09 |
| 0° C. | 1.10 |

The table shows the relationship between the temperatures of the photodetectors 41A, 41B, 41C . . . and the temperature correction coefficients. The temperature correction coefficients are provided for respective one of the temperatures of the photodetectors 41A, 41B, 41C . . . . The photodetection signals A, B, C . . . which are detected in the light quantity correction operation which will be described later are multiplied by the temperature correction coefficients corresponding to the temperatures of the photodetectors 41A, 41B, 41C . . . , whereby corrected photodetection signals A, B, C . . . are obtained. The strength of the photodetection signals A, B, C . . . which have passed through the integrating circuits 42A, 42B, 42C . . . and the S/H circuits 43A, 43B, 43C . . . increases as the temperatures of the photodetectors 41A, 41B, 41C . . . , the integrating circuits 42A, 42B, 42C . . . , and the S/H circuits 43A, 43B, 43C . . . increase. Therefore, the table shows smaller coefficients as the temperature of the photodetectors 41A, 41B, 41C . . . increases.

The control circuit 37 refers to Table 2 to determine the temperature correction coefficient based on the temperature of the photodetector 41A. For example, when the temperature of the photodetector 41A is 30° C., the control circuit 37 determines that the temperature correction coefficient is 0.95. The control circuit 37 stores the determined temperature correction coefficient in the memory section 50. The control circuit 37 uses the temperature correction coefficient stored in the memory section 50 in the temperature correction operation which will be described later.

The control circuit 37 also carries out the above-described operations on the photodetectors 41B, 41C . . . .

Gain Setting Operation

Figure 8:
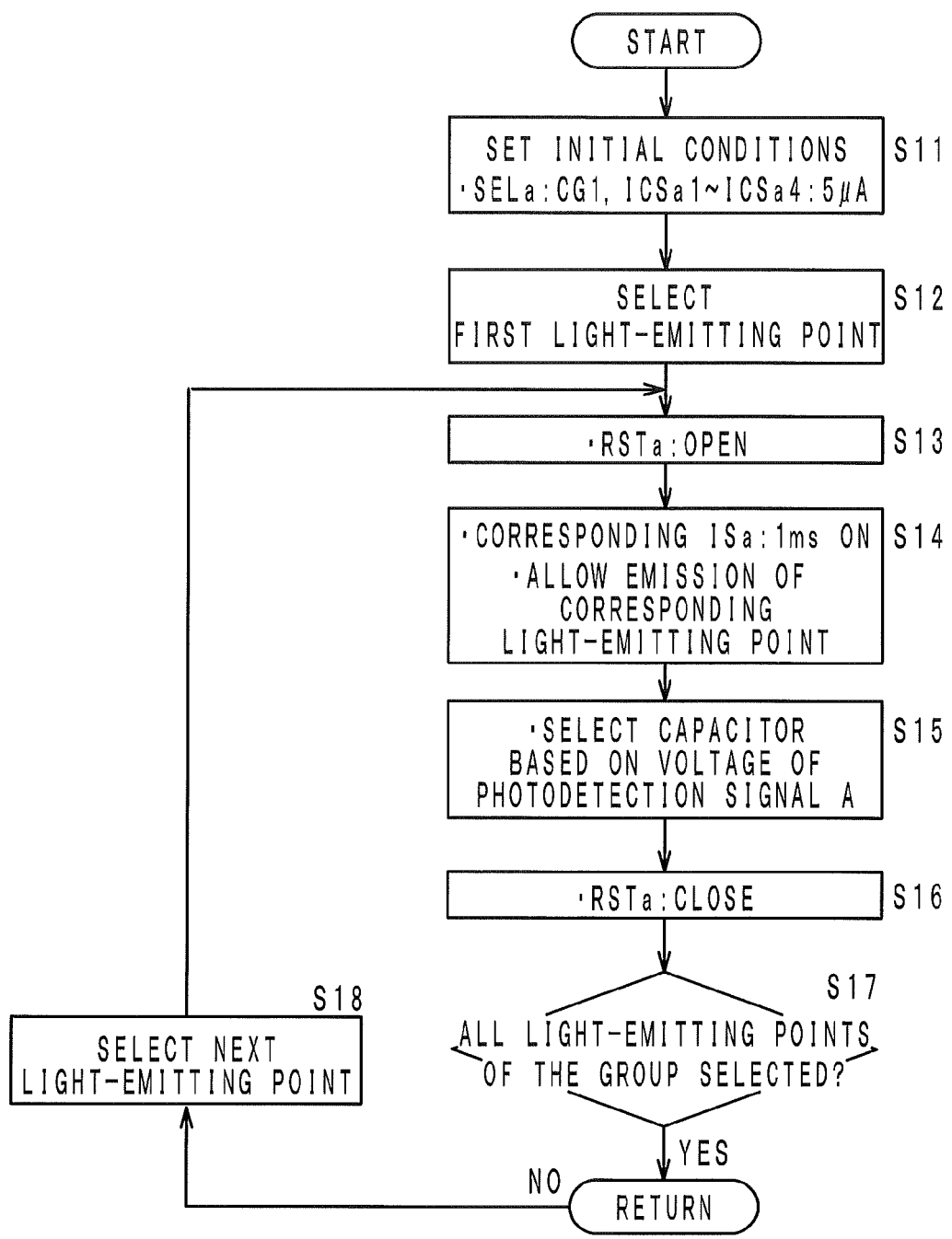
FIG. 8 is a subroutine of a gain setting operation of step S02 of FIG. 6.
Figure 9:
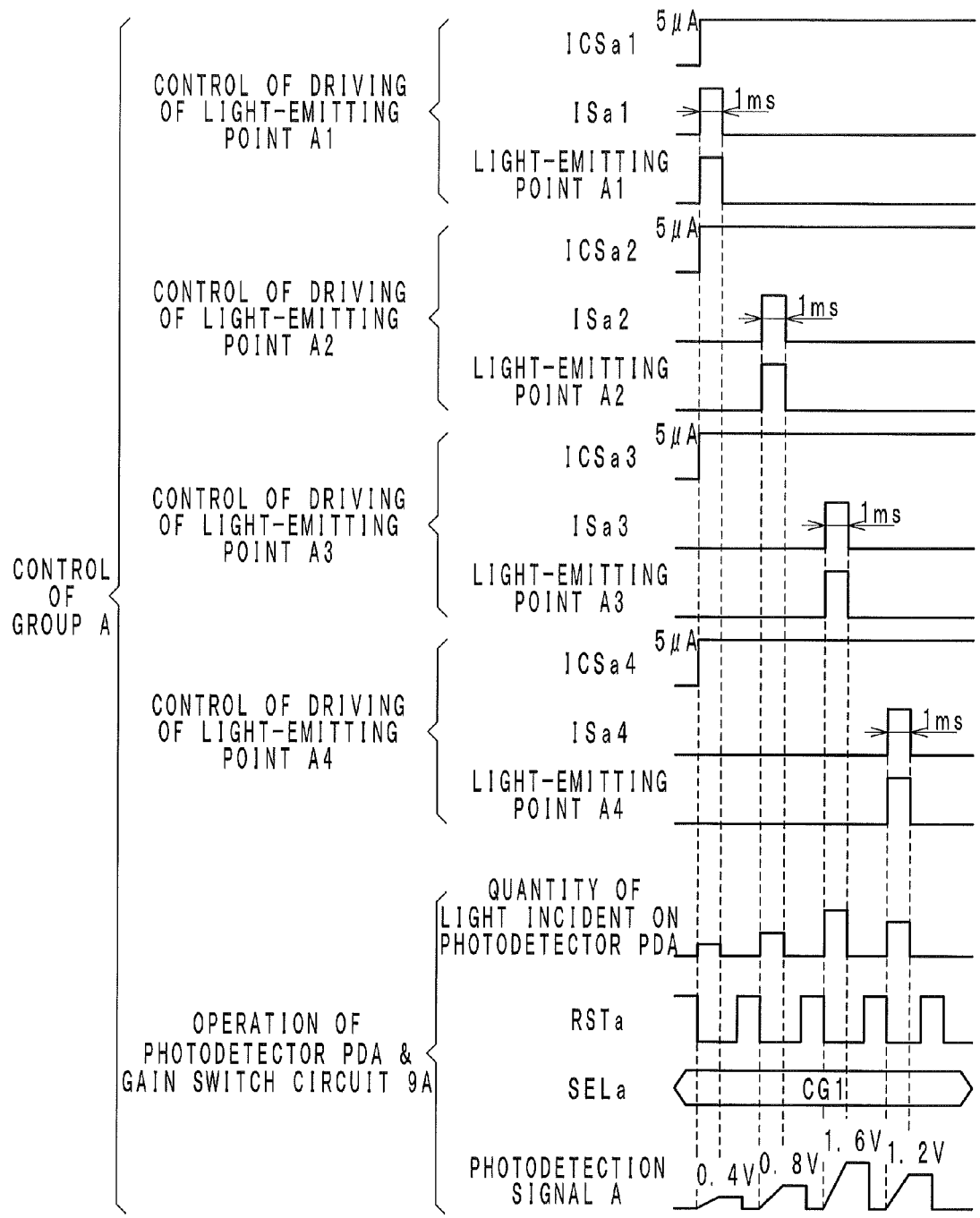
FIG. 9 is a timing chart of the gain setting operation.

Next, the gain setting operation of step S04 is described with reference to the drawings. FIG. 8 is a subroutine of the gain setting operation of step S02 of FIG. 6. FIG. 9 is a timing chart of the gain setting operation. Although FIG. 8 shows only the gain setting operation carried out on the group A, the same gain setting operation is carried out on the other groups.

In FIG. 8, firstly, the initial conditions are set (step S11). Specifically, the control circuit 37 sends the selection signal SELa to the switch 93 to select one of the capacitors CG1 to CG4. In the present embodiment, the capacitor CG1 is selected and connected between the inverted input terminal (−) and the output terminal of the operational amplifier 91. Here, in setting the initial conditions, an OLED-PH 17 whose cumulative light-emitting time is almost zero (i.e., unused OLED-PH 17) is used.

The control circuit 37 further sets a common drive current value to the light-emitting points A1 to A4 by the current control signals ICSa1 to ICSa4. In the present embodiment, the drive current value is 5 μA.

Then, the control circuit 37 selects one of the light-emitting points A1 to A4 as the first target of the process (step S12).

Then, the control circuit 37 sends the reset signal RSTa to open the switch 92 so that the capacitor CG1 is chargeable (step S13).

Then, the control circuit 37 sends the switching signal ISa to the drive circuit 6A connected to the targeted light-emitting point to turn on the drive circuit 6A. The drive circuit 6A is kept on for a predetermined time period (e.g., 1 ms) to allow the targeted light-emitting point A to emit light (step S14). The predetermined time period is a charge time (i.e., integral time) of the capacitor CG1.

The photodetector 41A receives the light emitted from the light-emitting point A and outputs a current value $I_{PDA}$ in accordance with the quantity of the received light. The current value $I_{PDA}$ is sent to the gain switch circuit 9A, whereby the capacitor CG1 is charged for a period of 1 ms. In this period, the gain switch circuit 9A outputs a photodetection signal A which is relative to the integral of input voltages.

Then, the control circuit 37 first receives the photodetection signal A in regard to the targeted light-emitting point, the photodetection signal A being relative to the integral value for which the capacitor CG1 was used, and detects the voltage value of the photodetection signal A (step S15).

A table as shown by Table 3 below is preliminarily stored in the memory section 50.

TABLE 3

| $V_{OUT}$ of Photodetection Signal A | Capacitor to be Selected |
|---|---|
| 0 V ≤ $V_{OUT}$ < 0.25 V | CG4: 0.125 pF |
| 0.25 V ≤ $V_{OUT}$ < 0.5 V | CG3: 0.25 pF |
| 0.5 V ≤ $V_{OUT}$ < 1 V | CG2: 0.5 pF |
| 1 V ≤ $V_{OUT}$ < 2 V | CG1: 1 pF |

The table shows a capacitor to be selected (one of the capacitors CG1 to CG4) for each voltage range of the photodetection signal A. In order to ensure a wide dynamic range, as is apparent from the expression (1), it is necessary that the output voltage $V_{OUT}$ in the process of ordinary optical writing is high. Therefore, the table shows a capacitor with a smaller capacitance for a lower voltage $V_{OUT}$ of the photodetection signal A. For example, Table 3 above shows the followings: when the voltage $V_{OUT}$ is equal to or more than 0 V and less than 0.25 V, the capacitor CG4 (0.125 pF) is selected; when the voltage $V_{OUT}$ is equal to or more than 0.25 V and less than 0.5 V, the capacitor CG3 (0.25 pF) is selected; when the voltage $V_{OUT}$ is equal to or more than 0.5 V and less than 1.0 V, the capacitor CG2 (0.5 pF) is selected; and when the voltage $V_{OUT}$ is equal to or more than 1.0 V and less than 2.0 V, the capacitor CG4 (1 pF) is selected.

When the control circuit 37 detects a voltage of the photodetection signal A in regard to the targeted light-emitting point, the control circuit 37 selects one of the capacitors CG1 to CG4 with reference to the table (step S15).

Then, the control circuit 37 sends the reset signal RSTa to close the switch 92 so that the capacitor CG1 is discharged to 0 V (step S16).

Then, the control circuit 37 determines whether or not all the light-emitting points A1 to A4 of the group A have been selected (step S17). If all the light-emitting points A1 to A4 have not been selected, the process proceeds to step S18. If all the light-emitting points A1 to A4 have been selected, the process ends.

If all the light-emitting points A1 to A4 have not been selected, the control circuit 37 selects one of unselected light-emitting points of the group A (step S18). Thereafter, the process returns to step S13. Then, the operations of steps S13 to S17 are carried out on the new target.

Next, a specific example of the gain setting operation is described with reference to the timing chart of FIG. 9.

First, at step S11 of setting the initial conditions, the control circuit 37 sends the current control signals ICSa1 to ICSa4 to set a common drive current value (in this embodiment, 5 μA) to the light-emitting points A1 to A4. The drive current value is such a value to allow the OLED-PH 17 at the initial stage of use (that is, before deterioration) to emit an adequate quantity of light to the photoreceptor drum 31.

Thereafter, at the first time of coming to step S14, the control circuit 37 outputs the switching signal ISa1 for the first target light-emitting point A so as to allow the light-emitting point A to emit light for 1 ms.

The current value $I_{PDA-A1}$ from the photodetector 41A while the light-emitting point A1 is selected is assumed to be 0.4 nA. The charge time (in other words, the integral time of the gain switch circuit 9A) $T_{PHOTO}$ is 1 ms. Under these conditions, the voltage value of the photodetection signal A while the light-emitting point A1 is selected, $V_{OUT-A1}$, is calculated as shown by the following expression (2).

$$V_{OUT-A1}=0.4nA\times1ms/1pF=0.4V \qquad (2)$$

At the first time of coming to step S15, the table is referred to select one of the capacitors CG1 to CG4 as the capacitor to be used for ordinary optical writing. In regard to the light-emitting point A1, since the voltage $V_{OUT-A1}$ is 0.4 V, the capacitor CG3 is selected as shown in Table 3.

Thereafter, at step S18, for example, the light-emitting point A2 is selected as the next target. In this case, at the second time of coming to step S14, the switching signal ISa2 is output, whereby the light-emitting point A2 emits light for 1 ms.

While the light-emitting point A2 is selected, the current value $I_{PDA-A2}$ is assumed to be 0.8 nA. The charge time $T_{PHOTO}$ is 1 ms. The voltage value of the photodetection signal A while the light-emitting point A2 is selected, $V_{OUT-A2}$, is calculated as shown by the following expression (3).

$$V_{OUT-A2}=0.8nA\times1ms/1pF=0.8V \qquad (3)$$

At the second time of coming to step S15, in regard to the light-emitting point A2, the capacitor CG2 is selected as the capacitor to be used for ordinary optical writing as shown in Table 3.

Thereafter, at step S18, for example, the light-emitting point A3 is selected as the next target. In this case, at the third time of coming to step S14, the switching signal ISa3 is output, whereby the light-emitting point A3 emits light for 1 ms.

The current value $I_{PDA-A3}$ from the photodetector 41A while the light-emitting point A3 is selected is assumed to be 1.6 nA. The charge time $T_{PHOTO}$ is 1 ms. The voltage value of the photodetection signal A while the light-emitting point A3 is selected, $V_{OUT-A3}$, is calculated as shown by the following expression (4).

$$V_{OUT-A3}=1.6nA\times1ms/1pF=1.6V \qquad (4)$$

At the third time of coming to step S15, in regard to the light-emitting point A3, the capacitor CG1 is selected as the capacitor to be used for ordinary optical writing as shown in Table 3.

Thereafter, at step S18, for example, the light-emitting point A4 is selected as the next target. In this case, at the fourth time of coming to step S14, the switching signal ISa4 is output, whereby the light-emitting point A4 emits light for 1 ms.

The current value $I_{PDA-A4}$ from the photodetector 41A while the light-emitting point A4 is selected is assumed to be 1.2 nA. The charge time $T_{PHOTO}$ is 1 ms. The voltage of the photodetection signal A while the light-emitting point A4 is selected, $V_{OUT-A4}$, is calculated as shown by the following expression (5).

$$V_{OUT-A4}=1.2nA\times1ms/1pF=1.2V \qquad (5)$$

At the fourth time of coming to step S15, with respect to the light-emitting point A4, the capacitor CG1 is selected as the capacitor to be used for ordinary optical writing as shown in Table 3.

Light Quantity Correction Operation

Figure 10:
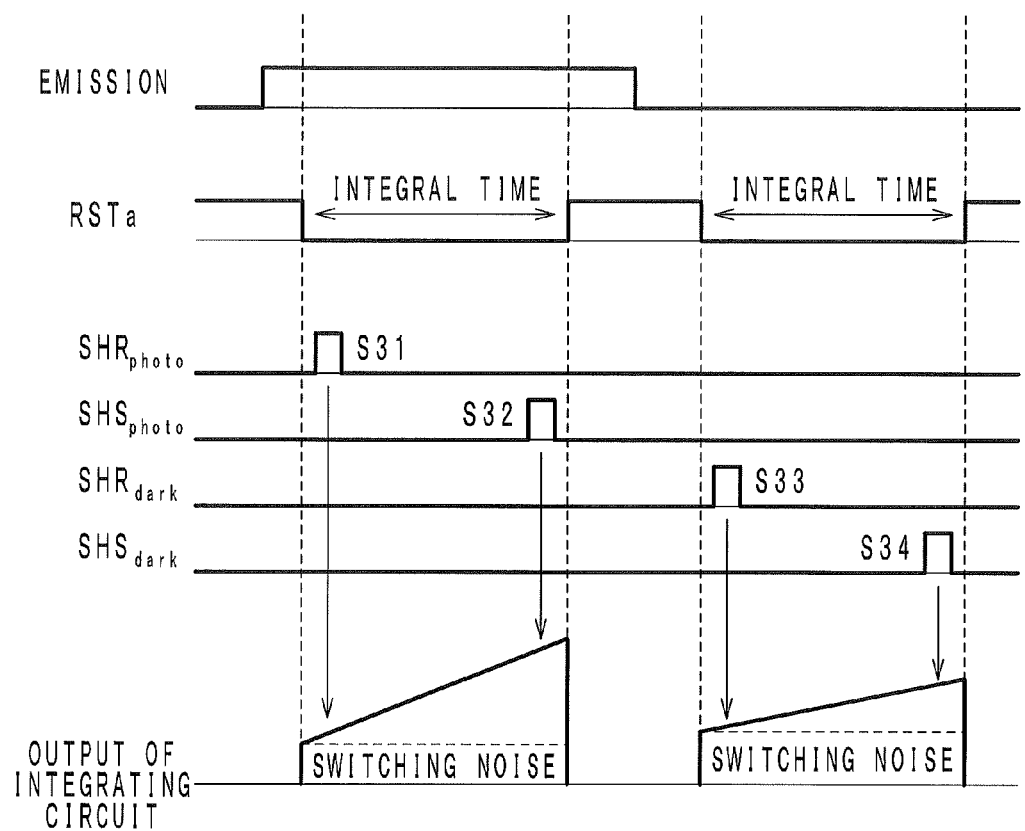
FIG. 10 is a timing chart of a light quantity correction operation.
Figure 11:
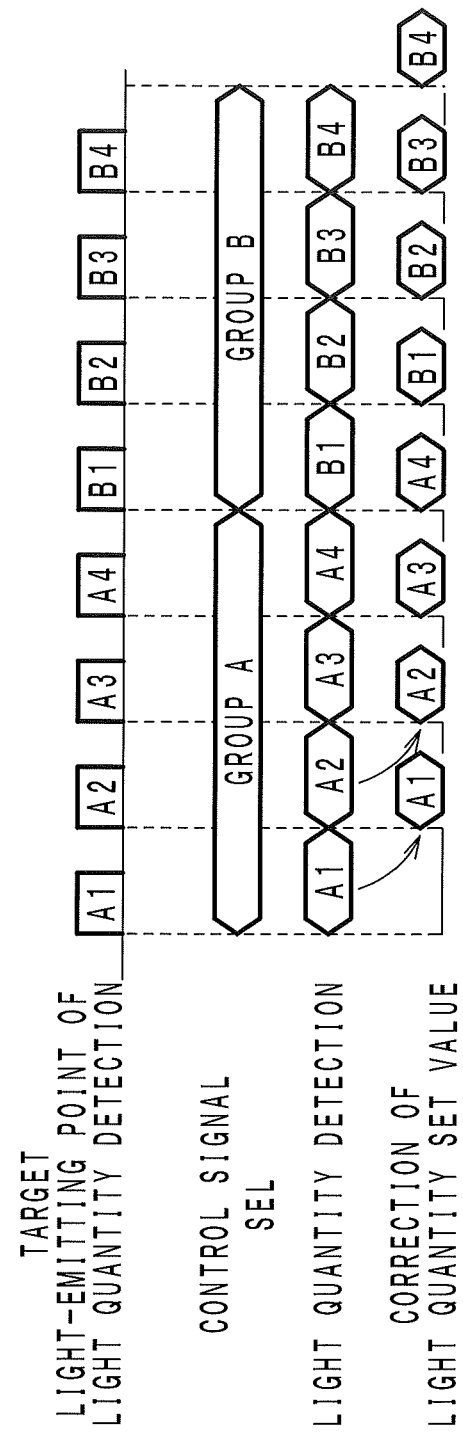
FIG. 11 is a timing chart showing a procedure of light quantity detection on a group-by-group basis.

Next, the light quantity correction operation of step S06 is described with reference to the drawings. FIG. 10 is a timing chart of the light quantity correction operation. FIG. 11 is a timing chart showing a procedure of light quantity detection on a group-by-group basis.

First, at step S31, the control circuit 37 allows only any one of the light-emitting points A1 to A4 which is the target of light quantity detection (e.g., light-emitting point A1) via corresponding one of the drive circuits 6A1 to 6A4 (e.g., drive circuit 6A1). Thereafter, the control circuit 37 sends the control signal RSTa to cancel the reset state of the integrating circuit 42A so that the output of the photodetector 41A can be accumulated in the capacitor of the integrating circuit 42A. At the same time, the control circuit 37 sends the control signal $SHR_{photo}$ to close the switch on the preceding stage side of the S/H circuit 43A-3 so that the output value of the integrating circuit 42A (at the start of integration) is recorded in the capacitor $VR_{photo}$. Thereafter, the control circuit 37 sends the control signal $SHR_{photo}$ to open the switch on the preceding stage side of the S/H circuit 43A-3.

At the subsequent step S32, after a predetermined time period has passed since the start of integration (i.e., after passage of the integral time) while only any one of the light-emitting points A1 to A4 which is the target of light quantity detection (e.g., light-emitting point A1) is kept ON, the control circuit 37 sends the control signal $SHS_{photo}$ to close the switch on the preceding stage side of the S/H circuit 43A-4 and records the output value of the integrating circuit 42A (after passage of the integral time) in the capacitor $VS_{photo}$. Thereafter, the control circuit 37 sends the control signal $SHS_{photo}$ to open the switch on the preceding stage side of the S/H circuit 43A-4 and sends the control signal RSTa to reset the integrating circuit 42A.

At the subsequent step S33, the control circuit 37 turns off all the light-emitting points A1 to A4. Thereafter, the control circuit 37 sends the control signal RSTa to cancel the reset state of the integrating circuit 42A so that the output of the photodetector 41A can be accumulated in the capacitor of the integrating circuit 42A. At the same time, the control circuit 37 sends the control signal $SHR_{dark}$ to close the switch on the preceding stage side of the S/H circuit 43A-1 so that the output value of the integrating circuit 42A (at the start of integration) is recorded in the capacitor $VR_{dark}$. Thereafter, the control circuit 37 sends the control signal $SHR_{dark}$ to open the switch on the preceding stage side of the S/H circuit 43A-1.

At the subsequent step S34, after a predetermined time period has passed since the start of integration (i.e., after passage of the integral time) while all the light-emitting points A1 to A4 are kept OFF, the control circuit 37 sends the control signal $SHS_{dark}$ to close the switch on the preceding stage side of the S/H circuit 43A-2 and records the output value of the integrating circuit 42A (after passage of the integral time) in the capacitor $VS_{dark}$. Thereafter, the control circuit 37 sends the control signal $SHS_{dark}$ to open the switch on the preceding stage side of the S/H circuit 43A-2 and sends the control signal RSTa to reset the integrating circuit 42A.

Then, the control circuit 37 sends the control signal SEL to close the switches on the succeeding stage side of the S/H circuits 43A-1 to 43A-4. Accordingly, the subtracting circuit 44-2 subtracts the value held by the capacitor $VR_{photo}$ from the value held by the capacitor $VS_{photo}$. Here, the value held by the capacitor $VS_{photo}$ is an output value of the integrating circuit 42A which is obtained at the start of emission of the targeted light-emitting point, and is formed by only a reset noise component produced at the time of emission. The value held by the capacitor $VR_{photo}$ is an output value of the integrating circuit 42A which is obtained after the integral time has passed since the start of emission of the light-emitting point, and includes a reset noise component at the time of emission and the output value of the photodetector 41A. Thus, by the above subtraction, an output value of the photodetector 41A from which the reset noise has been removed is obtained. This output value is output to the subtracting circuit 44-3 of the succeeding stage.

The subtracting circuit 44-1 subtracts the value held by the capacitor $VR_{dark}$ from the value held by the capacitor $VS_{dark}$. Here, the value held by the capacitor $VS_{dark}$ represents a reset noise component in the dark state. The value held by the capacitor $VR_{dark}$ is an output value of the integrating circuit 42A which is obtained after passage of the integral time while the targeted light-emitting point is in the dark state, and includes a reset noise component in the dark state and the output value of the photodetector 41A in the dark state (i.e., dark output value). Thus, by the above subtraction, a dark output value from which the reset noise has been removed is obtained. This dark output value is output to the subtracting circuit 44-3 of the succeeding stage.

The subtracting circuit 44-3 subtracts the dark output value from the output value of the photodetector 41A and outputs the output value $V_{sig}$ of the photodetector 41A from which the dark output has been removed to the ADC 46 of the succeeding stage. The ADC 46 outputs a digital value of the output value $V_{sig}$ of the photodetector 41A from which the dark output has been removed to the control circuit 37. As a result, the control circuit 37 obtains the photodetection signal A from which the reset noise component and the dark output component have been removed. Lastly, the control circuit 37 multiplies the output value $V_{sig}$ of the photodetection signal A by the temperature correction coefficient recorded in the memory section 50 at step S02.

While obtaining the photodetection signal A from which the reset noise component and the dark output component have been removed, the control circuit 37 carries out a light quantity correction operation on the photodetection signal A of the photodetector A4 which has been obtained in the immediately-previous cycle. In the light quantity correction operation, the control circuit 37 calculates the difference between the obtained photodetection signal A and a reference value and calculates such a light quantity set value that the difference is zero (0). The light quantity set value is overwritten in the memory section 50.

In the foregoing, the process carried out on one of the light-emitting points A1 to A4 of the group A has been described with reference to FIG. 10. Next, the process carried out on all the light-emitting points included in the OLED-PH 17 is described. As shown in FIG. 11, the control circuit 37 first sends the control signal SEL to select the group A and thereafter selects targets of light quantity detection from the light-emitting points A1 to A4 of the group A on a one-by-one basis. Then, as for the selected light-emitting point, the process shown in FIG. 10 is carried out to obtain the output value of the photodetector 41A. The control circuit 37 calculates the difference between the obtained output value and an intended value and derives such a light quantity set value that the difference is zero. The derived light quantity set value is recorded in a storage section (e.g., register) of a drive circuit corresponding to a light-emitting point which is the target of light quantity detection. Here, correction of the light quantity set value is performed while the process of FIG. 10 is carried out for the next light-emitting point. Such an operation is carried out for each of the light-emitting points A1 to A4.

Then, the control circuit 37 sends the control signal SEL to select the group B and thereafter carries out the above process in the same way as described above for the light-emitting points B1 to B4 of the group B. Thereafter, the control circuit 37 sends the control signal SEL to select the group C and thereafter carries out the above process in the same way as described above for the light-emitting points C1 to C4 of the group C.

Effects

According to the OLED-PH 17 that has the above-described configuration, the temperatures of the photodetectors 41A, 41B, 41C . . . can be determined. More specifically, in the OLED-PH 17, the control circuit 37 determines the temperatures of the photodetectors 41A, 41B, 41C . . . based on the current value $I_{PDA}$ output from the photodetector 41A while the light-emitting points A1 to A4 are OFF. The current value $I_{PDA}$ output from the photodetector 41A while the light-emitting points A1 to A4 are OFF includes a photodiode dark current. The photodiode dark current has a temperature dependence. Therefore, the control circuit 37 determines the magnitude of the photodiode dark current from the current value $I_{PDA}$ which is output from the photodetector 41A while the light-emitting points A1 to A4 are OFF, thereby determining the temperature of the photodetector 41A. As a result, in the OLED-PH 17, the quantity of light emitted from the light-emitting points A1 to A4 can be accurately detected in consideration of the temperature dependence of the photodetector 41A. Note that the same applies to the photodetectors 41B, 41C . . . as to the photodetector 41A, and therefore, the description thereof is herein omitted.

According to the OLED-PH 17, the magnitude of the photodiode dark current included in the current value $I_{PDA}$ which is output from the photodetector 41A while the light-emitting points A1 to A4 are OFF can be accurately determined. More specifically, the subtracting circuit 44 subtracts voltage value V1 held by the capacitor $VR_{photo}$ from voltage value V2 held by the capacitor $VS_{photo}$. Here, voltage value V1 is an output value of the integrating circuit 42A which is obtained at the start of integration while the light-emitting points A1 to A4 are OFF, and is formed by the reset noise. Voltage value V2 is an output value of the integrating circuit 42A which is obtained after the integral time has passed since the start of integration while the light-emitting points A1 to A4 are OFF, and is formed by the reset noise, the amplification noise, and the photodiode dark current. Therefore, in the subtracting circuit 44, the reset noise is removed, and the output value $V_{photo}$ which is formed by the amplification noise and the photodiode dark current can be obtained. Thus, the photodiode dark current can be easily extracted. Note that the same applies to the photodetectors 41B, 41C . . . as to the photodetector 41A, and therefore, the description thereof is herein omitted.

Here, the output value $V_{photo}$ includes the amplification noise. The amplification noise is random noise. The averaging circuit 48 outputs the average $V_{ave}$ of eight output values $V_{sig}$ to the control circuit 37. By averaging, the amplification noise that is random noise is removed from the eight output values $V_{sig}$. That is, the control circuit 37 can determine the magnitude of the photodiode dark current and can more accurately determine the temperature of the photodetector 41A based on the magnitude of the photodiode dark current. Note that the same applies to the photodetectors 41B, 41C . . . as to the photodetector 41A, and therefore, the description thereof is herein omitted.

When determining the temperature of the photodetector 41A, the OLED-PH 17 uses the current values $I_{PDA}$, $I_{PDB}$, $I_{PDC}$ . . . which are output from the photodetectors 41A, 41B, 41C . . . while the light-emitting points A1 to A4, B1 to B4, C1 to C4 . . . are OFF. Since the current values $I_{PDA}$, $I_{PDB}$, $I_{PDC}$ which are output from the photodetectors 41A, 41B, 41C . . . while the light-emitting points A1 to A4, B1 to B4, C1 to C4 . . . are OFF are very small, improving the detection accuracy of the photodetection signal A requires further increasing voltage value $V_{OUT}$ of the photodetection signal A such that a sufficient dynamic range is ensured. In view of such, in the OLED-PH 17, when determining the temperature of the photodetector 41A, the control circuit 37 uses the capacitor CG4 that has the smallest capacitance.

In the OLED-PH 17, the photodetectors 41A, 41B, 41C . . . are arranged so as to correspond to respective ones of the light-emitting points A1 to A4, B1 to B4, C1 to C4 This arrangement enables the control circuit 37 to obtain the temperature distribution of the photodetectors 41A, 41B, 41C . . . . Therefore, corrections can be made to the photodetection signals A, B, C output from the photodetectors 41A, 41B, 41C . . . based on the temperatures of the photodetectors 41A, 41B, 41C . . . . As a result, in the OLED-PH 17, the light-emitting points A1 to A4, B1 to B4, C1 to C4 . . . can be accurately controlled to emit light with an intended light quantity.

Other Embodiments

The optical writing device according to the present invention is not limited to the OLED-PH 17 that has been described above but can be varied within the scope of the spirit of the invention.

Although in the above-described example, in the OLED-PH 17, the total number of the photodetectors 41A, 41B, 41C . . . is smaller than the total number of the light-emitting points A1 to A4, B1 to B4, C1 to C4 . . . , the total number of the photodetectors 41A, 41B, 41C . . . may be equal to the total number of the light-emitting points A1 to A4, B1 to B4, C1 to C4 . . . . That is, the photodetectors correspond to the light-emitting points in a one-to-one manner.

In the OLED-PH 17, the relationship between the integral time in the temperature correction operation and the integral time in the light quantity correction operation is not especially mentioned. These may be equal to each other. Alternatively, one may be longer than the other. Note that, however, in the control circuit 37, it is preferred that the integral time in the case of determining the temperatures of the photodetectors 41A, 41B, 41C . . . (i.e., in the temperature correction operation) is longer than the integral time in the case of determining the quantity of light emitted from the light-emitting points A1 to A4, B1 to B4, C1 to C4 . . . (i.e., in the light quantity correction operation). In the temperature correction operation, the OLED-PH 17 uses the current values $I_{PDA}$, $I_{PDB}$, $I_{PDC}$ . . . which are output from the photodetectors 41A, 41B, 41C . . . while the light-emitting points A1 to A4, B1 to B4, C1 to C4 . . . are OFF. The current values $I_{PDA}$, $I_{PDB}$, $I_{PDC}$ . . . which are output from the photodetectors 41A, 41B, 41C . . . while the light-emitting points A1 to A4, B1 to B4, C1 to C4 . . . are OFF are very small. Thus, the OLED-PH can increase the dark-time output signal by increasing the integral time. Note that the OLED-PH 17 may change both the integral time and the gain, or either one of these, in the temperature correction operation.

Although in the above-described example the averaging circuit 48 averages digital output values $V_{sig}$, the averaging circuit 48 may average analog output values $V_{sig}$.

Although in the above-described example the control circuit 37 multiplies the output values $V_{sig}$ of the photodetection signals A, B, C . . . by the temperature correction coefficient, the control circuit 37 may instead perform an operation using a table, for example.

In the temperature correction operation, the subtracting circuit 44-3 subtracts the output value $V_{dark}$ from the output value $V_{photo}$. The output value $V_{dark}$ is zero (0). Therefore, the output value $V_{photo}$ may be employed as the output value $V_{sig}$. In this case, a bypass circuit is provided in parallel with the subtracting circuit 44-3.

In the temperature correction operation, a plurality of capacitors may be simultaneously used in the integrating circuit 42A.

The number of capacitors in the integrating circuit 42A is not limited to four but may be two or more.

The photodetector 41A, the integrating circuit 42A, the S/H circuit 43A, and the subtracting circuit 44 are preferably made of amorphous silicon and/or polysilicon.

Although the present invention has been described in connection with the preferred embodiment above, it is to be noted that various changes and modifications are possible to those who are skilled in the art. Such changes and modifications are to be understood as being within the scope of the invention.

What is claimed is:

1. An optical writing device comprising:
    a plurality of light-emitting points;
    a photodiode configured to output a signal which represents a quantity of incident light from a predetermined light-emitting point selected from the plurality of light-emitting points; and
    a calculation section for calculating a temperature of the photodiode based on a magnitude of a photodiode dark current included in the signal output from the photodiode while the predetermined light-emitting point is OFF, the calculation section includes a controller configured to determine the magnitude of the photodiode dark current based on an output value of an integrating circuit for integrating an output of the photodiode, the integrating circuit including a resettable capacitor, and wherein the integrating circuit includes a plurality of capacitors which have different capacitances, and the controller uses one of the capacitors which has the smallest capacitance for determination of the temperature of the photodiode.

2. The optical writing device according to claim 1, wherein the plurality of light-emitting points are arranged in a predetermined direction.

3. The optical writing device according to claim 1, wherein each of the light-emitting points is an OLED.

4. The optical writing device according to claim 1, wherein the predetermined light-emitting point emits light to scan a photoreceptor.

5. The optical writing device according to claim 4, wherein plural ones of the photodiode are provided so as to correspond to respective ones of the light-emitting points.

6. The optical writing device according to claim 4, wherein a total number of the photodiodes is smaller than a total number of the light-emitting points.

7. An image forming apparatus comprising the optical writing device as set forth in claim 1.

8. An optical writing device comprising:
    a plurality of light-emitting points;
    a photodiode configured to output a signal which represents a quantity of incident light from a predetermined light-emitting point selected from the plurality of light-emitting points; and
    a calculation section for calculating a temperature of the photodiode based on a magnitude of a photodiode dark current included in the signal output from the photodiode while the predetermined light-emitting point is OFF, wherein the calculation section includes
        an integrating circuit for integrating an output of the photodiode, the integrating circuit including a resettable capacitor,
        a S/H circuit capable of recording a first output value obtained at a start of integration in the integrating circuit while the predetermined light-emitting point is OFF and a second output value obtained after a predetermined time period has passed since the start of integration in the integrating circuit,
        a subtracting circuit for subtracting the first output value from the second output value to output a third output value, and
        a controller configured to determine the magnitude of the photodiode dark current based on the third output value.

9. The optical writing device according to claim 8, wherein
    the calculation section further includes an averaging circuit configured to output an average of plural ones of the third output value output from the subtracting circuit, and
    the controller accepts the average of plural ones of the third output value as the magnitude of the photodiode dark current.

10. The optical writing device according to claim 8, wherein
    the calculation section further includes a memory section for storing a table which represents a relationship between the magnitude of the photodiode dark current and the temperature of the photodiode, and
    the controller refers to the table to determine the temperature of the photodiode.

11. The optical writing device according to claim 8, wherein the controller determines the temperature of the photodiode by an interpolation operation.

12. The optical writing device according to claim 8, wherein
    the integrating circuit includes a plurality of capacitors which have different capacitances, and
    the controller uses one of the capacitors which has the smallest capacitance for determination of the temperature of the photodiode.

13. The optical writing device according to claim 8, wherein
    the S/H circuit is capable of recording a fourth output value obtained at the start of integration in the integrating circuit while the predetermined light-emitting point is ON and a fifth output value obtained after a predetermined time period has passed since the start of integration in the integrating circuit, and
    the controller determines a quantity of light emitted from the predetermined light-emitting point based on the first output value, the second output value, the fourth output value, and the fifth output value.

14. The optical writing device according to claim 13, wherein the controller sets the predetermined time period for determination of the temperature of the photodiode so as to be longer than the predetermined time period for determination of the quantity of light emitted from the predetermined light-emitting point.

15. A temperature calculation method for determining, in an optical writing device including a plurality of light-emitting points, a temperature of a photodiode configured to output a signal which represents a quantity of incident light from a predetermined light-emitting point selected from the plurality of light-emitting points, the method comprising the steps of:
    acquiring a signal from the photodiode while the predetermined light-emitting point is OFF; and
    determining the temperature of the photodiode based on a magnitude of a photodiode dark current included in the signal, wherein the magnitude of the photodiode dark current is based on an output value of an integrating circuit for integrating an output of the photodiode, the integrating circuit including a resettable capacitor, and the integrating circuit includes a plurality of capacitors which have different capacitances, and using one of the capacitors which has the smallest capacitance for determination of the temperature of the photodiode.

16. A temperature calculation method for determining, in an optical writing device including a plurality of light-emitting points, a temperature of a photodiode configured to output a signal which represents a quantity of incident light from a predetermined light-emitting point selected from the plurality of light-emitting points, the method comprising the steps of:

acquiring a signal from the photodiode while the predetermined light-emitting point is OFF; and determining the temperature of the photodiode based on a magnitude of a photodiode dark current included in the signal, wherein the determination of the magnitude of the photodiode current in the signal comprises:

integrating an output of the photodiode with an integrating circuit, the integrating circuit including a resettable capacitor, recording with a S/H circuit, a first output value obtained at a start of integration in the integrating circuit while the predetermined light-emitting point is OFF and a second output value obtained after a predetermined time period has passed since the start of integration in the integrating circuit, subtracting the first output value from the second output value to output a third output value, and determining the magnitude of the photodiode dark current based on the third output value.

17. The temperature calculation method according to claim 16, comprising:

arranging the plurality of light-emitting points in a predetermined direction.

18. The temperature calculation method according to claim 16, wherein the predetermined light-emitting point emits light to scan a photoreceptor.

19. The temperature calculation method according to claim 18, wherein plural ones of the photodiode are provided so as to correspond to respective ones of the light-emitting points.

20. The temperature calculation method according to claim 18, wherein a total number of the photodiodes is smaller than a total number of the light-emitting points.

\* \* \* \* \*